US011780966B2

(12) United States Patent
Wallin et al.

(10) Patent No.: US 11,780,966 B2
(45) Date of Patent: Oct. 10, 2023

(54) PARTIAL-CURE BONDING OF SILICONES THROUGH TEMPORARY INHIBITION

(71) Applicant: META PLATFORMS TECHNOLOGIES, LLC, Menlo Park, CA (US)

(72) Inventors: Thomas John Farrell Wallin, Redmond, WA (US); Leif-Erik Sharif Simonsen, Kirkland, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 326 days.

(21) Appl. No.: 16/931,243

(22) Filed: Jul. 16, 2020

(65) Prior Publication Data

US 2021/0024700 A1  Jan. 28, 2021

Related U.S. Application Data

(60) Provisional application No. 62/878,218, filed on Jul. 24, 2019, provisional application No. 62/979,700, filed on Feb. 21, 2020.

(51) Int. Cl.
| | |
|---|---|
| *C08G 77/12* | (2006.01) |
| *B01J 23/42* | (2006.01) |
| *C08K 5/14* | (2006.01) |
| *C08G 77/20* | (2006.01) |
| *C08G 77/08* | (2006.01) |

(52) U.S. Cl.
CPC .............. *C08G 77/12* (2013.01); *B01J 23/42* (2013.01); *C08G 77/08* (2013.01); *C08G 77/20* (2013.01); *C08K 5/14* (2013.01)

(58) Field of Classification Search
CPC ........ C08G 77/12; C08G 77/20; C08G 77/08; C08L 83/04; B01J 23/42; C08K 5/14
See application file for complete search history.

(56) References Cited

U.S. PATENT DOCUMENTS

| 5,527,837 | A | * | 6/1996 | Kondou | ................... | C08K 9/10 |
|---|---|---|---|---|---|---|
| | | | | | | 523/210 |
| 2015/0183960 | A1 | * | 7/2015 | Yamazaki | ............... | C08L 83/04 |
| | | | | | | 524/866 |
| 2017/0008210 | A1 | | 1/2017 | Koellnberger et al. | | |

FOREIGN PATENT DOCUMENTS

| CN | 104093809 A | 10/2014 |
|---|---|---|
| CN | 104379673 A | 2/2015 |
| CN | 105939829 A | 9/2016 |
| CN | 108699338 A | 10/2018 |
| WO | 2014002918 A1 | 1/2014 |
| WO | 2017143961 * | 8/2017 |
| WO | 2017143961 A1 | 8/2017 |

OTHER PUBLICATIONS

International Preliminary Report on Patentability for International Application No. PCT/US2020/043110, dated Feb. 3, 2022, 8 pages.
International Search Report and Written Opinion for International Application No. PCT/US2020/043110, dated Oct. 26, 2020, 9 Pages.
Office Action dated Oct. 8, 2022 for Chinese Application No. 202080053119.9, filed Jul. 22, 2020, 17 pages.
Office Action dated Mar. 29, 2023 for Chinese Application No. 202080053119.9, filed Jul. 22, 2020, 11 pages.

* cited by examiner

*Primary Examiner* — Kuo Liang Peng
(74) *Attorney, Agent, or Firm* — Morgan, Lewis & Bockius LLP

(57) ABSTRACT

A polymer article is provided that includes a first silicone component formed from (i) a first siloxane polymer comprising a first plurality of hydride-functional groups and (ii) a second siloxane polymer comprising a first plurality of vinyl-functional groups. The polymer article also includes a second silicone component formed from (i) a third siloxane polymer comprising a second plurality of hydride-functional groups and (ii) a fourth siloxane polymer comprising a second plurality of vinyl-functional groups. Lastly, the polymer includes a contact interface, between the first and second silicone components, comprising chemical cross-links between the first siloxane polymer and the fourth siloxane polymer. Notably, a tensile strength of the polymer article across the contact interface is substantially equal to a tensile strength of the first silicone component or the second silicone component alone.

15 Claims, 19 Drawing Sheets

PARTIAL-CURE BONDING OF SILICONES THROUGH TEMPORARY INHIBITION

RELATED APPLICATIONS

This application claims the benefit of, and priority to, U.S. Provisional Patent Application Ser. No. 62/878,218, filed Jul. 24, 2019 and U.S. Provisional Patent Application Ser. No. 62/979,700, filed Feb. 21, 2020. All of these applications are incorporated by reference herein in their entireties.

TECHNICAL FIELD

The disclosure relates generally to polymer networks, including but not limited to partial-cure bonding of silicones.

BACKGROUND

The most common avenue for fabricating silicone-based soft machines is replica molding, where commercial liquid silicone mixtures are poured into molds and allowed to cure. In order to obtain more complex geometries, molded parts must often be further assembled and laminated into hierarchies. Such lamination steps, however, present fundamental challenges as strong bonding between silicone structures can be difficult to achieve owing, in large part, to the chemical inertness of the polydimethylsiloxane backbone of silicone. To that end, some bonding strategies currently exist, but each has certain drawbacks or limitations. For example, glues and adhesives introduce stress concentrations at the interface that can lead to debonding and, in turn, delamination. The surface energy of silicones also makes finding an appropriate adhesive chemistry challenging. The addition of glues may also change local mechanical properties or lead to excess material filling channels. As another example, $O_2$ plasma treatment in conjunction with silane primers of silicone surfaces can create silanol groups that can be utilized for bonding via condensation reactions, often through silane primer intermediates. However, plasma treatment is not tractable for arbitrarily complex 3D structures, and bond strength is highly variable depending on processing conditions.

Partial-cure bonding typically yields the best results without negatively impacting mechanical properties of the base material. However, curing kinetics are dependent on geometry and are incredibly difficult to control across different designs, as appropriate timing is required to allow for both shape fixity during demolding and maintenance of enough unreacted groups for bonding at the interface.

SUMMARY

Accordingly, there is a need for silicones that can be easily bonded together and maintain their mechanical properties. To address these needs, embodiments herein are directed toward the temporary inhibition of silicone reactions in addition- (platinum-) cured silicones, which are commonly used industrial materials that possess useful mechanical properties (e.g., large ultimate elongations, high resiliency). Addition-cured silicones cure from multi-part mixtures based on, in one example, the catalyzed reaction of silicon hydride with vinyl groups between different polymeric precursors (e.g., SiH+C=C) over the course of minutes (to hours) at room temperature. Without wishing to be bound by any particular theory, temporary inhibition of silicone reactions is achieved either through the addition of a chemical agent (i.e., an inhibitor) to the multi-part mixture that can increase the lifespan of C=C and SiH functional groups during curing, or otherwise by blocking a catalyst. These unreacted groups can then be used for bonding across silicone interfaces (e.g., two silicone substrates/components can be bonded together without needing an adhesive or surface treatment). As detailed below, after removal (usually at elevated temperatures) of the chemical agent blended with the multi-part mixtures of an addition-cured silicone, the resulting material reaches its final mechanical properties.

Notably, the introduction of the chemical agent/additive does not wholly prevent the C=C and SiH functional groups from reacting with each other. Rather, the chemical agent limits the hydrosilylation reaction of some, but not all, of the functional groups, which allows some of the C=C and SiH functional groups to also react. In this way, a partially-cured intermediate article is formed that can be handled (i.e., an article this is sufficiently gelled to permit handling and demolding), which allows for lamination steps to occur (along with other operations). After removal (usually at elevated temperatures) of the chemical agent, the partially-cured intermediate article can fully cure into a final article.

(A1) In accordance with some embodiments, the solution explained above can be implemented as a polymer composition. In such implementations, the polymer composition includes a blended resin comprising: (i) a first siloxane polymer comprising a plurality of hydride-functional groups and (ii) a second siloxane polymer comprising a plurality of vinyl-functional groups. Furthermore, the blended resin may also include an hydroperoxide inhibitor that is configured to temporarily inhibit some, but not all, of the plurality of vinyl-functional groups from forming chemical crosslinks with the plurality of hydride-functional groups. Notably, the hydroperoxide inhibitor is between 0.0001% and 0.5% by weight of the blended resin.

(A2) In accordance with some embodiments of A1, the hydroperoxide inhibitor is further configured to react with one or more crosslinkable groups from the plurality of vinyl functional groups of the second siloxane polymer to limit a crosslinking reaction between the first and second siloxane polymers. In some embodiments, the hydroperoxide inhibitor is further configured to block a catalyst.

(A3) In accordance with some embodiments of any of A1-A2, when the blended resin is exposed to a first temperature (e.g., room temperature): (i) some of the plurality of hydride-functional groups form chemical crosslinks with some, but not all, of the plurality of vinyl-functional groups, and (ii) the hydroperoxide inhibitor reacts with some, but not all, of the plurality of vinyl-functional groups. In some embodiments, the hydroperoxide inhibitor blocks a catalyst.

(A4) In accordance with some embodiments of A3, when the blended resin is exposed to a second temperature greater (e.g., approximately 100 degrees Celsius) than the first temperature: (i) the hydroperoxide inhibitor decomposes, and (ii) the plurality of hydride-functional groups forms chemical crosslinks with any unbonded vinyl-functional groups of the plurality of vinyl-functional groups (i.e., vinyl-functional groups of the plurality of vinyl-functional groups that were previously bonded with the now decomposed hydroperoxide inhibitor or unbonded as a result of the hydroperoxide inhibitor occupying bond sites). In some embodiments, the hydroperoxide inhibitor is deactivated or otherwise removed and no longer available to block a catalyst.

(B1) In accordance with some embodiments, the solution explained above can be implemented in the following example method. The method includes providing a first silicone substrate that is partially cured and formed from (i) a first siloxane polymer comprising a first plurality of hydride-functional groups, (ii) a second siloxane polymer comprising a plurality of vinyl-functional groups, and (iii) a chemical inhibitor linked with, or otherwise blocking one or more crosslinkable groups or catalyst, less than all, from the plurality of vinyl-functional groups. The method also includes assembling the first silicone substrate with a second silicone substrate, which is also partially cured, to create a contact interface between the first and second silicone substrates. The second silicone substrate includes a third siloxane polymer with a second plurality of hydride-functional groups having unbonded crosslinkable groups. The method also includes, after the assembling, heating the first and second silicone substrates above a predefined temperature, which causes (i) the chemical additive to at least partially decompose, and (ii) a second crosslinking reaction, across the contact interface, between at least some of the one or more crosslinkable groups from the plurality of vinyl-functional groups and the unbonded crosslinkable groups from the second plurality of hydride-functional groups of the third siloxane polymer. In doing so, a three-dimensional polymer articles is formed. The second crosslinking reaction may also be between one or more crosslinkable groups of the first plurality of hydride-functional groups and vinyl-functional groups included in the second silicone substrate. Notably, a tensile strength of the three-dimensional polymer article across the contact interface is substantially equal to a tensile strength of the first silicone substrate or the second silicone substrate alone.

(B2) In accordance with some embodiments of B1, providing the first silicone substrate comprises: (i) blending (e.g., at room temperature) the first siloxane polymer, the second siloxane polymer, and the chemical inhibitor to form a blended resin, and (ii) producing the first silicone substrate from the blended resin. In some embodiments, the blended resin has the polymer composition of A1-A4.

(B3) In accordance with some embodiments of B2, the blending initiates the first crosslinking reaction between the first siloxane polymer, the second siloxane polymer, and the chemical inhibitor. Furthermore, the chemical inhibitor occupies a number of crosslink-bond sites of the second siloxane polymer during the first crosslinking reaction, which limits crosslinking between the first and second siloxane polymers during the first crosslinking reaction. Notably, the first and second siloxane polymers are able to bond to such a degree that the first silicone substrate reaches a gelled state, whereby it can withstand a certain amount of shear (e.g., the first silicone substrate can safely be demolded and otherwise handled).

(B4) In accordance with some embodiments of B3, the first crosslinking reaction is initiated at a first activation energy (e.g., room temperature), the second crosslinking reaction is initiated at a second activation energy that is greater than the first activation energy, and a magnitude of the second activation energy is dictated by the chemical inhibitor. In some embodiments, the second activation energy is associated with an elevated temperature, which may be approximately 100 degrees Celsius.

(C1) In accordance with some embodiments, the solution explained above can be implemented in the following example polymer article. The polymer article includes: (A) a first silicone component formed from (i) a first siloxane polymer comprising a first plurality of hydride-functional groups and (ii) a second siloxane polymer comprising a first plurality of vinyl-functional groups, and (B) a second silicone component formed from (i) a third siloxane polymer comprising a second plurality of hydride-functional groups and (ii) a fourth siloxane polymer comprising a second plurality of vinyl-functional groups. The polymer article also includes a contact interface, between the first and second silicone components, comprising chemical crosslinks between the first siloxane polymer and the fourth siloxane polymer. Importantly, a tensile strength of the polymer article across the contact interface is substantially equal to a tensile strength of the first silicone component or the second silicone component alone. It is noted that the polymer article may be formed from the polymer composition of A1-A4 and/or the method of B1-B4.

(C2) In accordance with some embodiments of C1, the second silicone component further comprises hydroperoxide-reaction products.

(C3) In accordance with some embodiments of C2, a reaction between the third siloxane polymer and the fourth siloxane polymer further comprises a hydroperoxide inhibitor. In such embodiments, the hydroperoxide-reaction products are formed from the hydroperoxide inhibitor.

(C4) In accordance with some embodiments of any of C2-C3, between 0.0001% and 0.1% by weight of the hydroperoxide inhibitor is included in the reaction between the third siloxane polymer and the fourth siloxane polymer. In such instances, a percentage by weight of the hydroperoxide inhibitor is positively related to a Young's modulus of the second silicone component. In other words, if the second silicone component has a high Young's modulus (high relative to commercial silicones in a given class), then the percentage by weight of the hydroperoxide inhibitor may be closer to 0.1%. In contrast, if the second silicone component has a low Young's modulus (high relative to commercial silicones in the given class), then the percentage by weight of the hydroperoxide inhibitor may be closer to 0.0001%.

(C5) In accordance with some embodiments of any of C2-C4, the hydroperoxide inhibitor is configured to: (i) react with one or more crosslinkable groups from the second plurality of vinyl-functional groups of the fourth siloxane polymer to limit a first crosslinking reaction between the third and fourth siloxane polymers, and (ii) decompose when heated above a threshold temperature. Decomposition of the hydroperoxide inhibitor triggers a second crosslinking reaction between at least some of the one or more crosslinkable groups from the second plurality of vinyl-functional groups and unbonded crosslinkable groups from the first plurality of hydride-functional groups of the first siloxane polymer.

(C6) In accordance with some embodiments of C5, the first crosslinking reaction is triggered by a first amount of energy, the second crosslinking reaction is triggered by a second amount of energy that is greater than the first amount of energy, and the hydroperoxide inhibitor is designed to set the second amount of energy (and, in some cases, also evaporate when exposed to the second amount of energy).

(C7) In accordance with some embodiments of any of C1-C6, mechanical and/or thermal properties of the contact interface are substantially similar to the mechanical and/or thermal properties of the first silicone component and the second silicone component.

(C8) In accordance with some embodiments of any of C1-C7, an unbonded channel is formed along a portion of the contact interface. In some embodiments, the unbonded channel is formed without the use of an adhesive or some other surface treatment. Rather, the unbonded channel is formed by exposing the first silicone component and/or the second silicone component to an elevated temperature before assembling the first silicone component with the second silicone component.

(C9) In accordance with some embodiments of C8, the polymer article further includes a conduit fluidically coupling the unbonded channel with a fluid source (e.g., a pneumatic device).

In accordance with some embodiments, the disclosure provides a gelled or partially cured resin mixture comprising a first polymer component comprising a plurality of —$CH_2$—$CH_2$—Si— groups, a second polymer component comprising a plurality of —CH=$CH_2$ groups, and a third polymer component comprising a plurality of Si—H groups, wherein the stoichiometric ratio of —$CH_2$—$CH_2$—Si—:—CH=$CH_2$:Si—H=x:y:z, wherein x ranges from about 0.1 to about 0.9, x+y=1, and x+z ranges from 1 to about 1.5. In some embodiments, x is about 0.1. In some embodiments, x is about 0.2. In some embodiments, x is about 0.3. In some embodiments, x is about 0.4. In some embodiments, x is about 0.5. In some embodiments, x is about 0.6. In some embodiments, x is about 0.7. In some embodiments, x is about 0.8. In some embodiments, x is about 0.9. In some embodiments, x+z is about 1. In some embodiments, x+z is about 1.1. In some embodiments, x+z is about 1.2. In some embodiments, x+z is about 1.3. In some embodiments, x+z is about 1.4. In some embodiments, x+z is about 1.5. The stoichiometric ratio of —$CH_2$—$CH_2$—Si—:—CH=$CH_2$:Si—H in the gelled or partially cured material can be calculated from the ratios of silicone components used, the amount of inhibitor used, or otherwise by using analytical methods known in the art such as IR, $^1$H-NMR, $^{13}$C-NMR, etc. In some embodiments, x ranges from about 0.1 to about 0.25, from about 0.1 to about 0.5, or from about 0.1 to about 0.75. In some embodiments, x is selected from about 0.1, about 0.2, about 0.3, about 0.4, about 0.5, about 0.6, about 0.7, about 0.8, and about 0.9. In some embodiments, x+z ranges from 1 to about 1.1, from 1 to about 1.15, from 1 to about 1.15, from 1 to about 1.2, or from 1 to about 1.25.

In accordance with some embodiments, the disclosure provides a gelled or partially cured resin mixture described herein, the gelled or partially cured resin mixture further comprising a metal catalyst. In some embodiments, metal is platinum.

In accordance with some embodiments, the disclosure provides a gelled or partially cured resin mixture described herein, the gelled or partially cured resin mixture further comprising an inhibitor. In some embodiments, the concentration of the inhibitor in the gelled or partially cured resin mixture is between about 0.0001% and about 0.1% by weight. In some embodiments, the concentration of the inhibitor in the gelled or partially cured resin mixture is between about 0.1% and about 0.5% by weight. In some embodiments, the concentration of the inhibitor in the gelled or partially cured resin mixture is about 0.01%, about 0.02%, about 0.03%, about 0.04%, about 0.05%, about 0.06%, about 0.07%, about 0.08%, about 0.09%, or about 0.1%. In some embodiments, the inhibitor is a hydroperoxide compound.

In accordance with some embodiments, the disclosure provides a gelled or partially cured resin mixture described herein, the gelled or partially cured resin mixture is shelf stable at a given temperature for a period of time between 1 day and about 365 days. In some embodiments, the temperature is room temperature. In some embodiments, the temperature is 20° C. In some embodiments, the gelled or partially cured resin mixture is shelf stable at room temperature for at least one day. In some embodiments, the gelled or partially cured resin mixture has unlimited shelf stability when refrigerated at a temperature lower than room temperature.

In accordance with some embodiments, the disclosure provides a gelled or partially cured resin mixture described herein, wherein the gelled or partially cured resin mixture can topographically conform to a 3D surface, and/or wherein the gelled or partially cured resin mixture is stretchable.

In accordance with some embodiments, the disclosure provides a process of making a polymer article, the process comprising providing, obtaining, or receiving a gelled or partially cured resin mixture described herein, and subjecting the gelled or partially cured resin mixture to a temperature higher than room temperature. In some embodiments, the temperature is lower than 100° C. In some embodiments, the temperature is about 45° C., about 50° C., about 55° C., about 60° C., about 65° C., about 70° C., about 75° C., about 80° C., about 85° C., about 90° C., about 95° C., or about 100° C.

In accordance with some embodiments, the disclosure provides a process of making a polymer article as described herein, the process further comprising a mechanical processing step. In some embodiments, the mechanical processing step occurs before the subjecting to a temperature higher than room temperature step. In some embodiments, the mechanical processing step comprises thermoforming. In some embodiments, the mechanical processing step comprises stretching. In some embodiments, the mechanical processing step comprises compressing. In some embodiments, the mechanical processing step comprises attaching a first portion of gelled or partially cured resin mixture to a second portion of gelled or partially cured resin mixture, wherein the stoichiometric ratios of —$CH_2$—$CH_2$—Si—:—CH=$CH_2$:Si—H in the first and second portions may be substantially different, substantially similar, or identical.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures and specification.

FIG. 10A illustrates the normally processed material (Bluestar V3040), while FIG. 10B illustrates the inhibited material. The data was then fitted to an exponential decay to extract rate constants k. Each temperature has its own corresponding rate constant, which are thereafter fitted to the Arrhenius equation (Eq 2) and extracted the activation energy (FIG. 10C):

$$\frac{[C=C]}{[C=C]_0} = e^{-kt} \quad [\text{Eq. 1}]$$

$$k = Ae^{-E_a/RT} \quad [\text{Eq. 2}]$$

$$\ln k = -\frac{E_a}{R}\left(\frac{1}{T}\right) + \ln A \quad [\text{Eq. 2.1}]$$

$$E_{a_{Inhibited}} \approx 5.12 \pm 0.91 \frac{kJ}{\text{mol}}$$

$$E_{a_{Uninhibited}} \approx 1.91 \pm 0.24 \frac{kJ}{\text{mol}}$$

$$\left[\frac{k_{Inhibited}}{k_{Uninhibited}}\right]_{T=20°\,C.} \approx \frac{Ai}{Au}[\exp-(Ea,i-Ea,u)/RT]$$

Figure 11A:
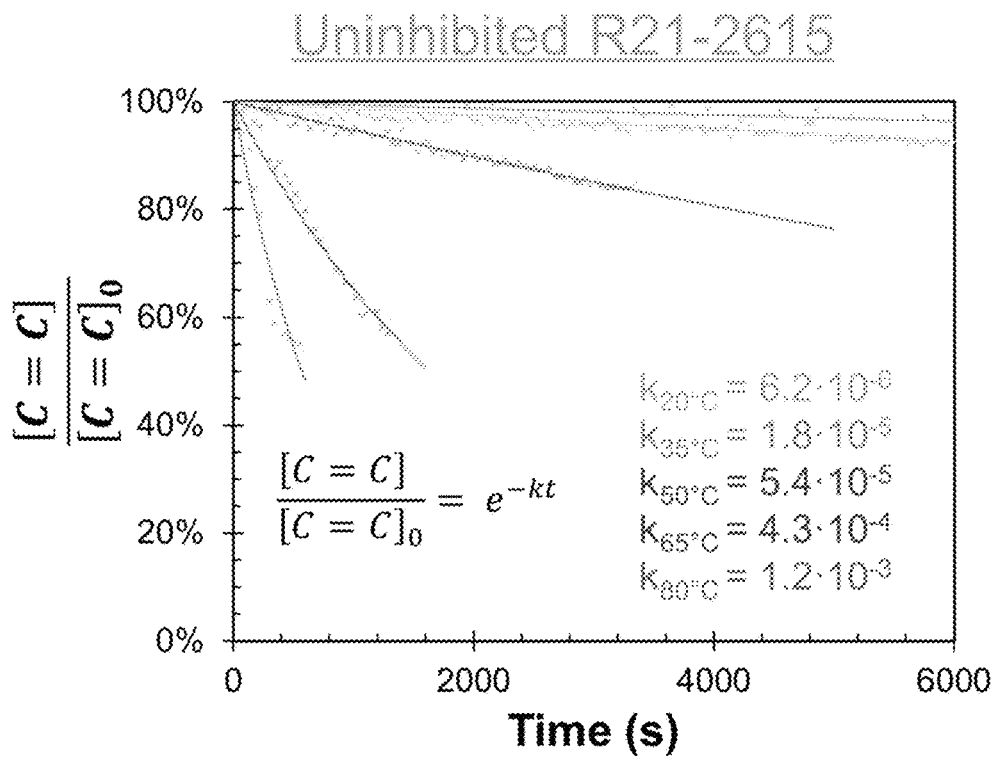
Figure 11B:
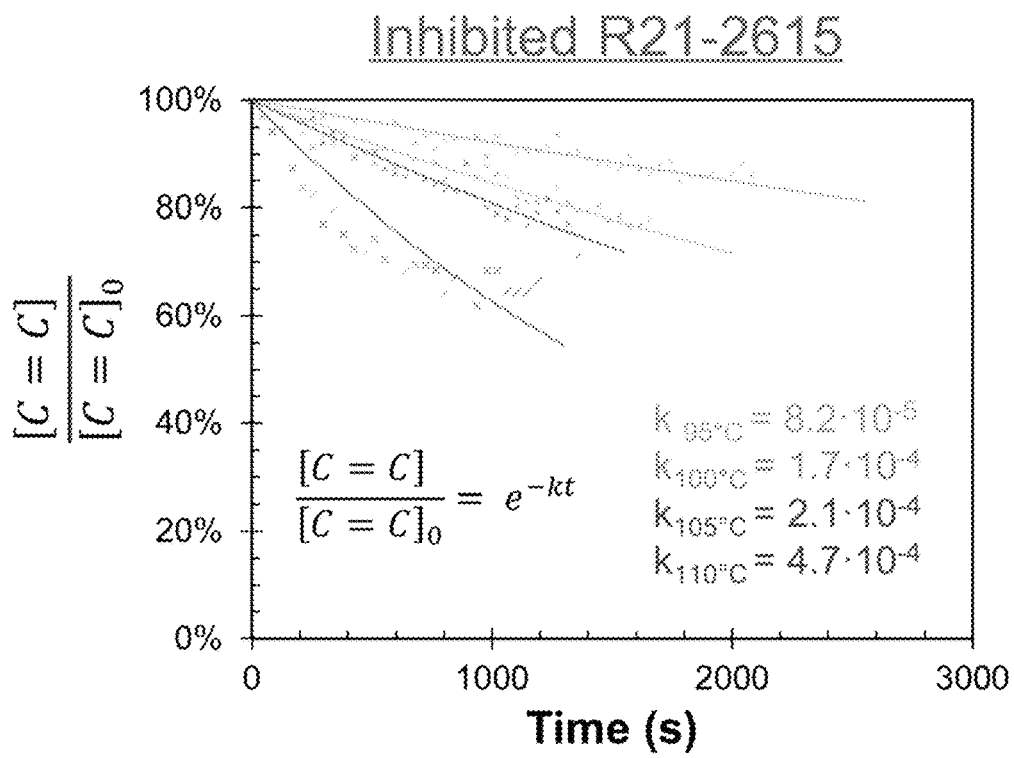
Figure 11C:
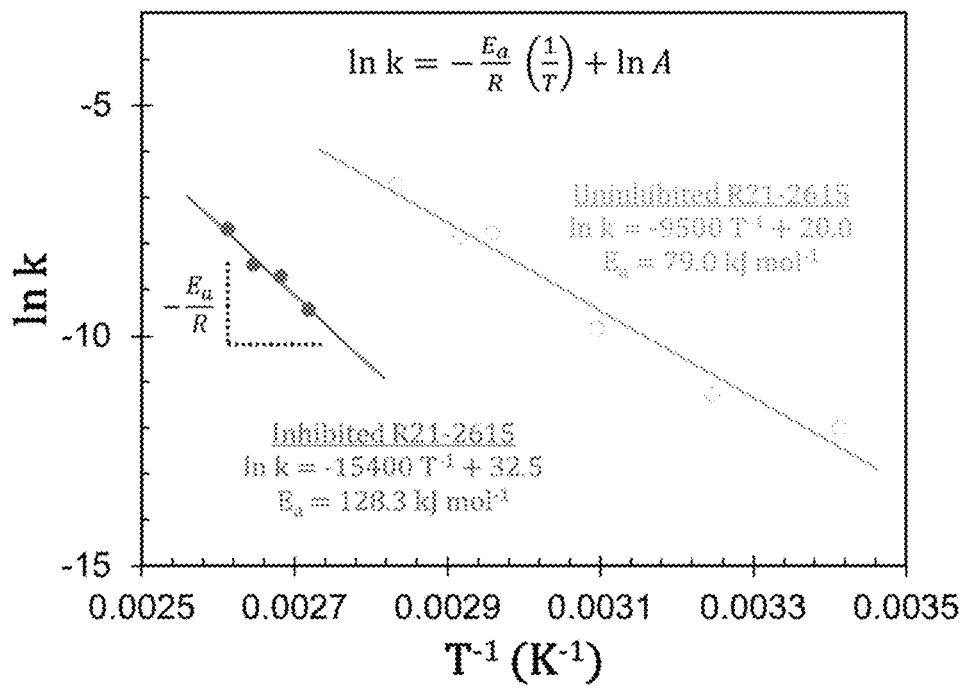
Figure 11D:
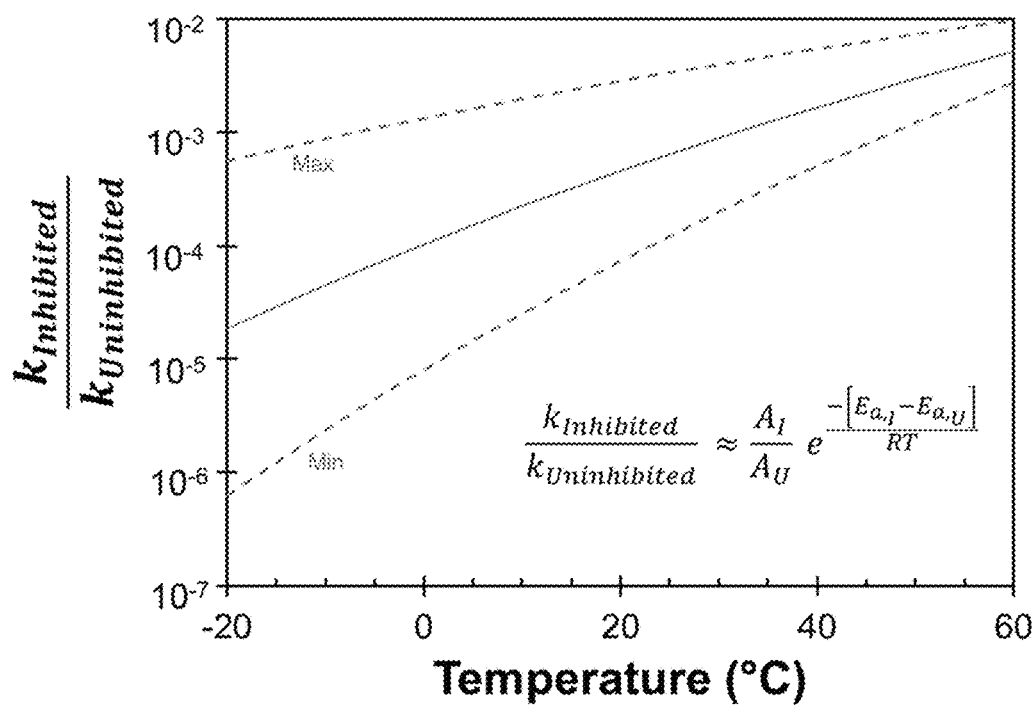

FIGS. 11A-11D illustrate the results of FTIR experiments that track the vinyl (C=C) bond density over time at different temperatures for Nusil R21-2615; each line represents a different temperature during experiment. FIG. 11A illustrates the normally processed material (Nusil R21-2615), while FIG. 11B illustrates the plot for the inhibited material. The data was fitted to an exponential decay to extract rate constants k as described herein. Each temperature has its own corresponding rate constant. The constants were fitted to the Arrhenius equation (Eq 2) and the activation energy extracted (FIG. 11C). FIG. 11D illustrates the theoretical rate of C=C reaction in the inhibited and uninhibited systems. At 20° C. the inhibited silicone has approximately $10^{-4}$ times slower reaction of C=C groups. The max and min lines reflect the uncertainty that propagates from the fitting method, which appears relatively large, but shows that the reaction is about 1000 times slower at 20° C.

Figure 12:
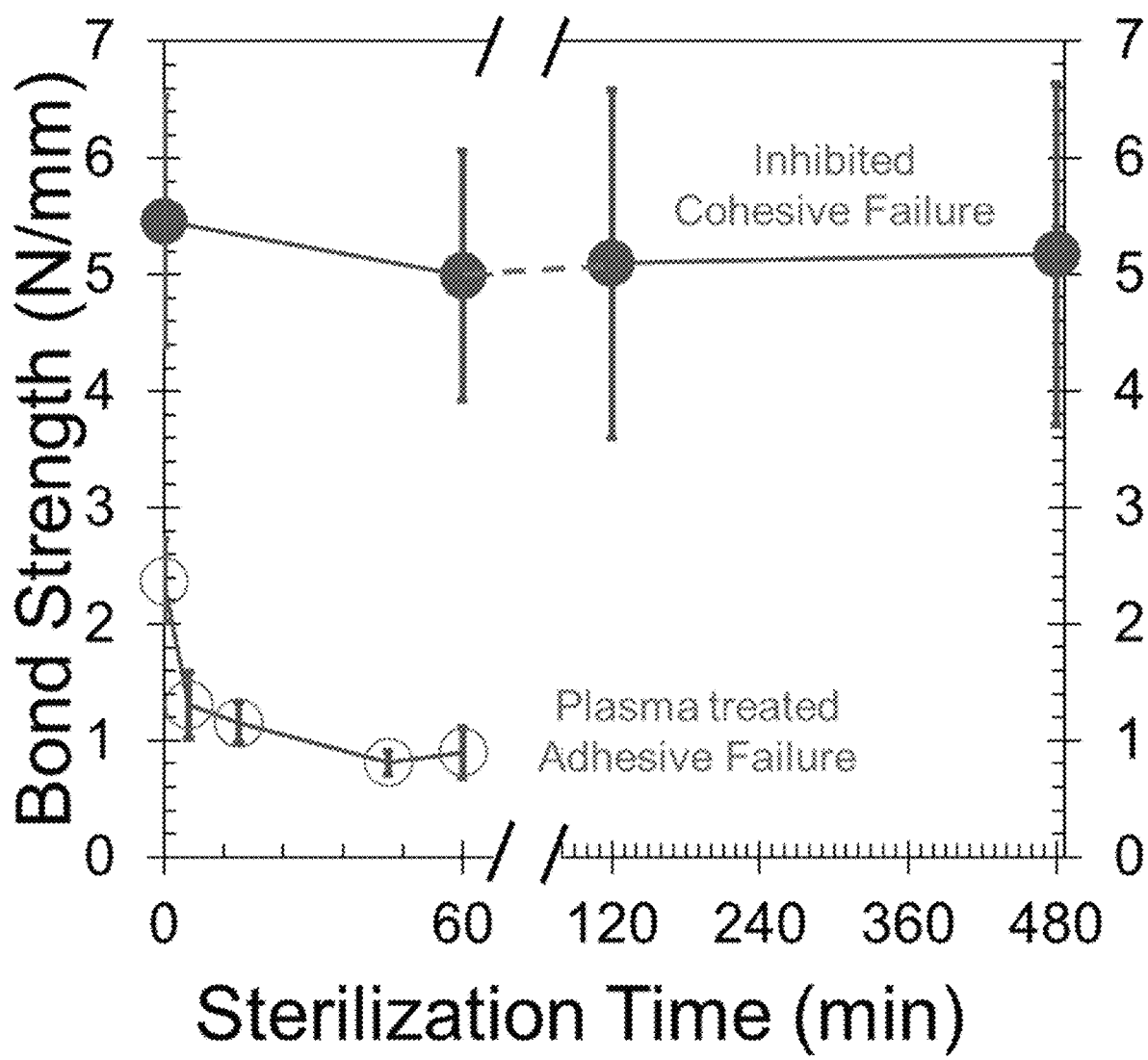

FIG. 12 illustrates a comparison in the bond strength for Bluestar-V3040 bonded to itself by different methods. The top line corresponds to a process including inhibiting the material, demolding, assembling and heating (as outlined in FIGS. 4A and 4B). The bottom line corresponds to a process including using plasma treatment methods established in literature (200 W, $O_2$ plasma, 1 min). The coupons are then autoclaved (sterilized) with supersaturated steam (T<134° C.) for varying periods of time. The inhibited bonded samples possess a greater initial bond strength and maintain cohesive failure for over 8 hours of sterilization. The bond strength in the plasma bonded samples rapidly degrade in these conditions.

Figure 13A:
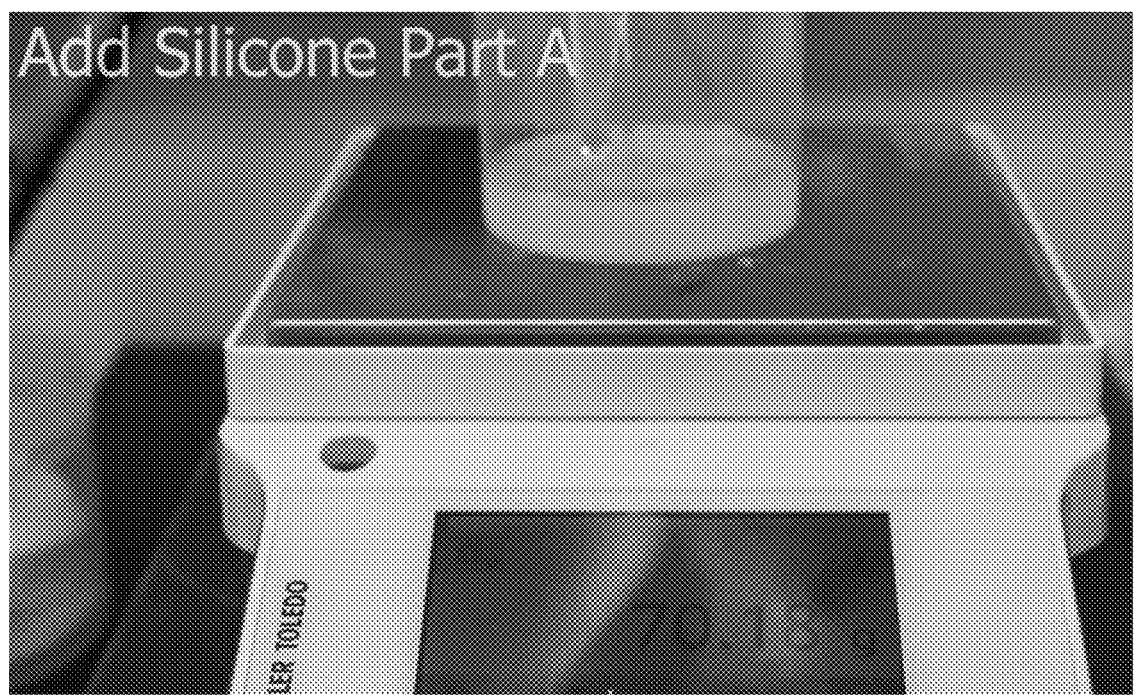
Figure 13B:
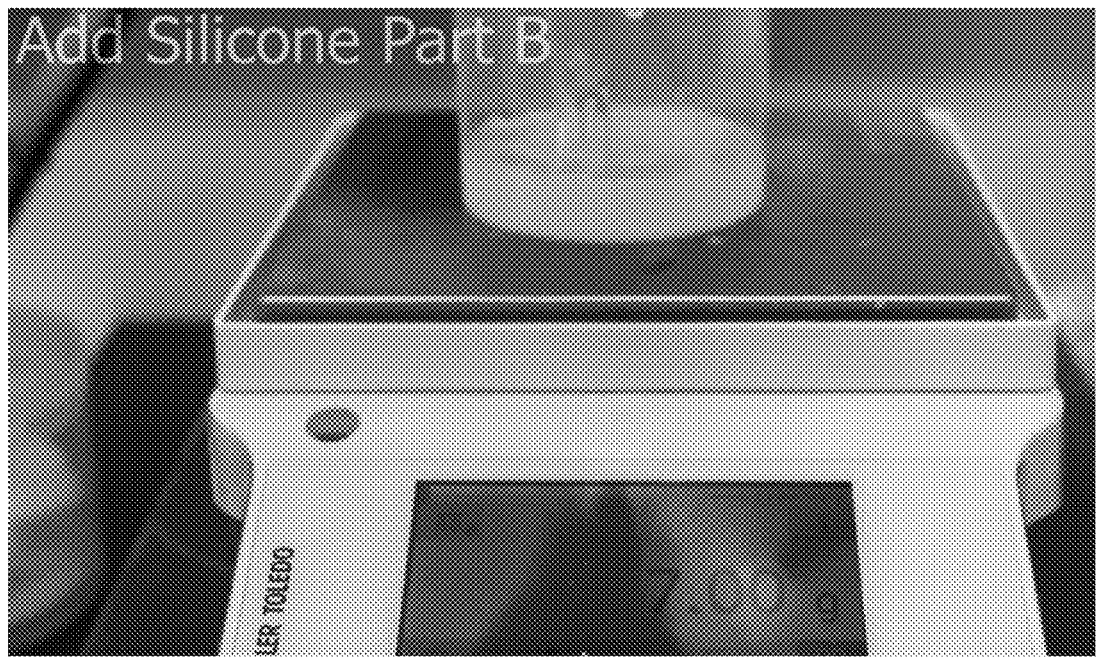
Figure 13C:
Figure 13D:
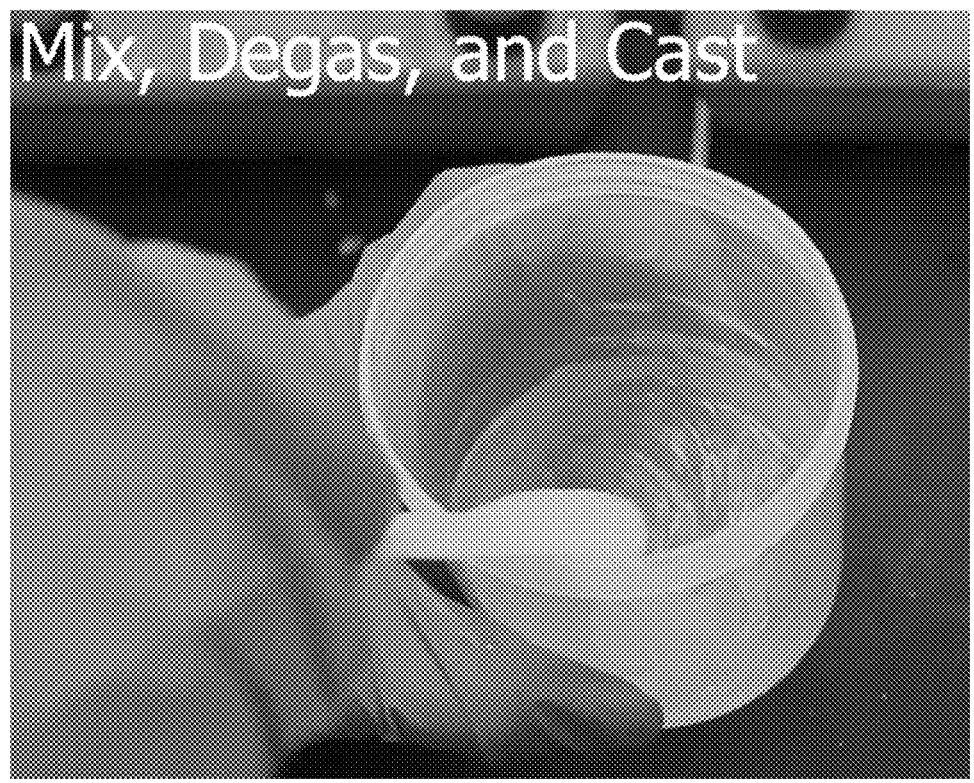
Figure 13E:
Figure 13F:
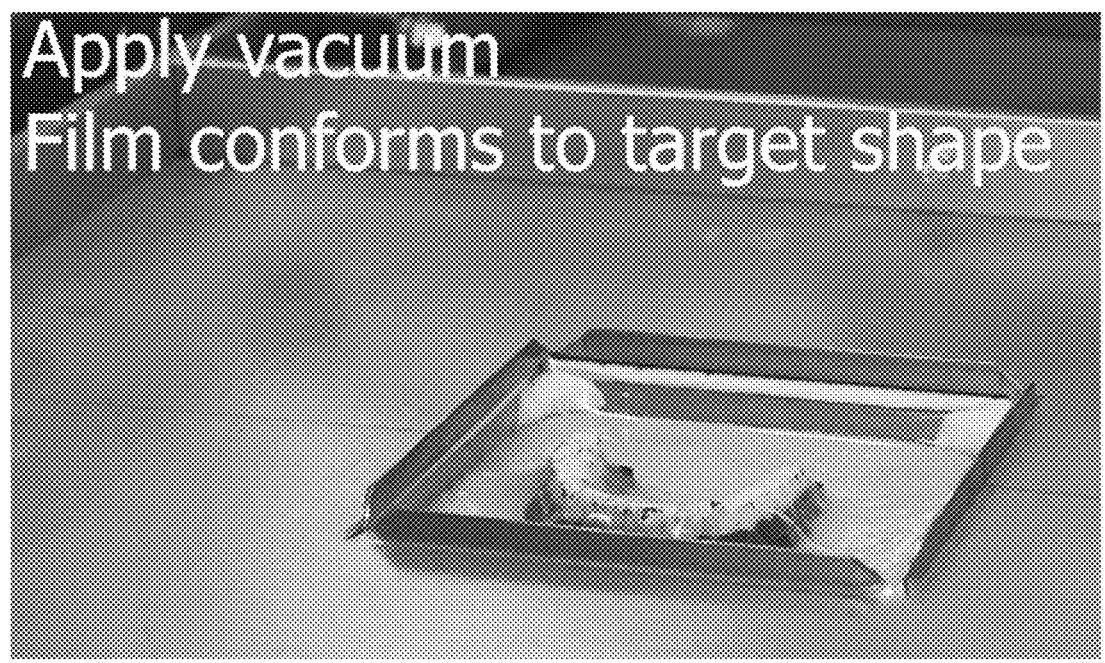
Figure 13G:
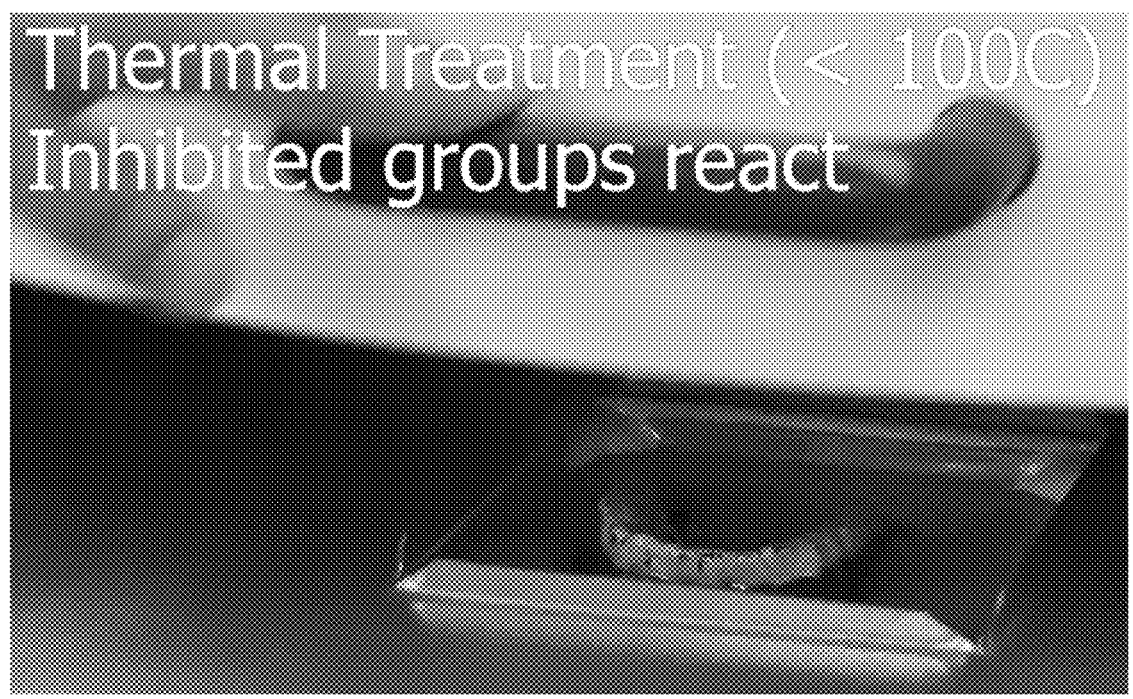
Figure 13H:
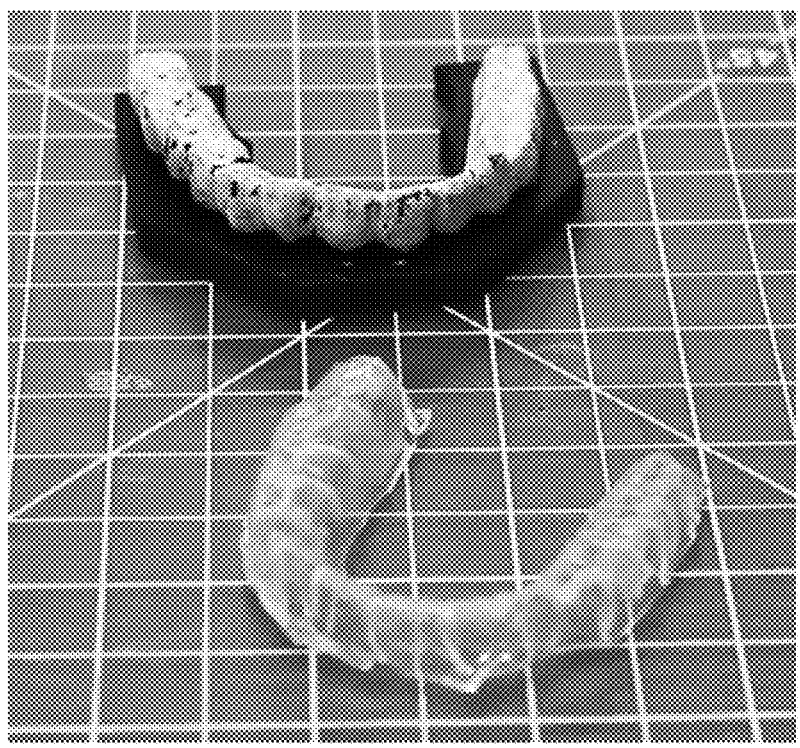

FIGS. 13A-13H illustrate the steps of an exemplary process and resulting article described herein. FIGS. 13A, 13B, 13C, and 13D illustrate the steps of weighing various components of a resin mixture, and then mixing, degassing, and casting the mixture to form a film. FIG. 13E illustrate a resulting flexible film including a gelled (or partially cured) resin mixture. FIGS. 13F and 13G illustrate the use of a flexible film including a gelled (or partially cured) resin mixture as used in a thermoforming application. FIG. 13H illustrate a fully cured article as demolded from the target shape after a thermoforming process.

DESCRIPTION OF EMBODIMENTS

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, steps, operations, elements, and/or components, but do not preclude the presence or addition of one or more other features, steps, operations, elements, components, and/or groups thereof.

As used herein, the term "if" means "when" or "upon" or "in response to determining" or "in response to detecting" or "in accordance with a determination that," depending on the context. Similarly, the phrase "if it is determined" or "if [a stated condition or event] is detected" means "upon determining" or "in response to determining" or "upon detecting [the stated condition or event]" or "in response to detecting [the stated condition or event]" or "in accordance with a determination that [a stated condition or event] is detected," depending on the context.

Figure 1:
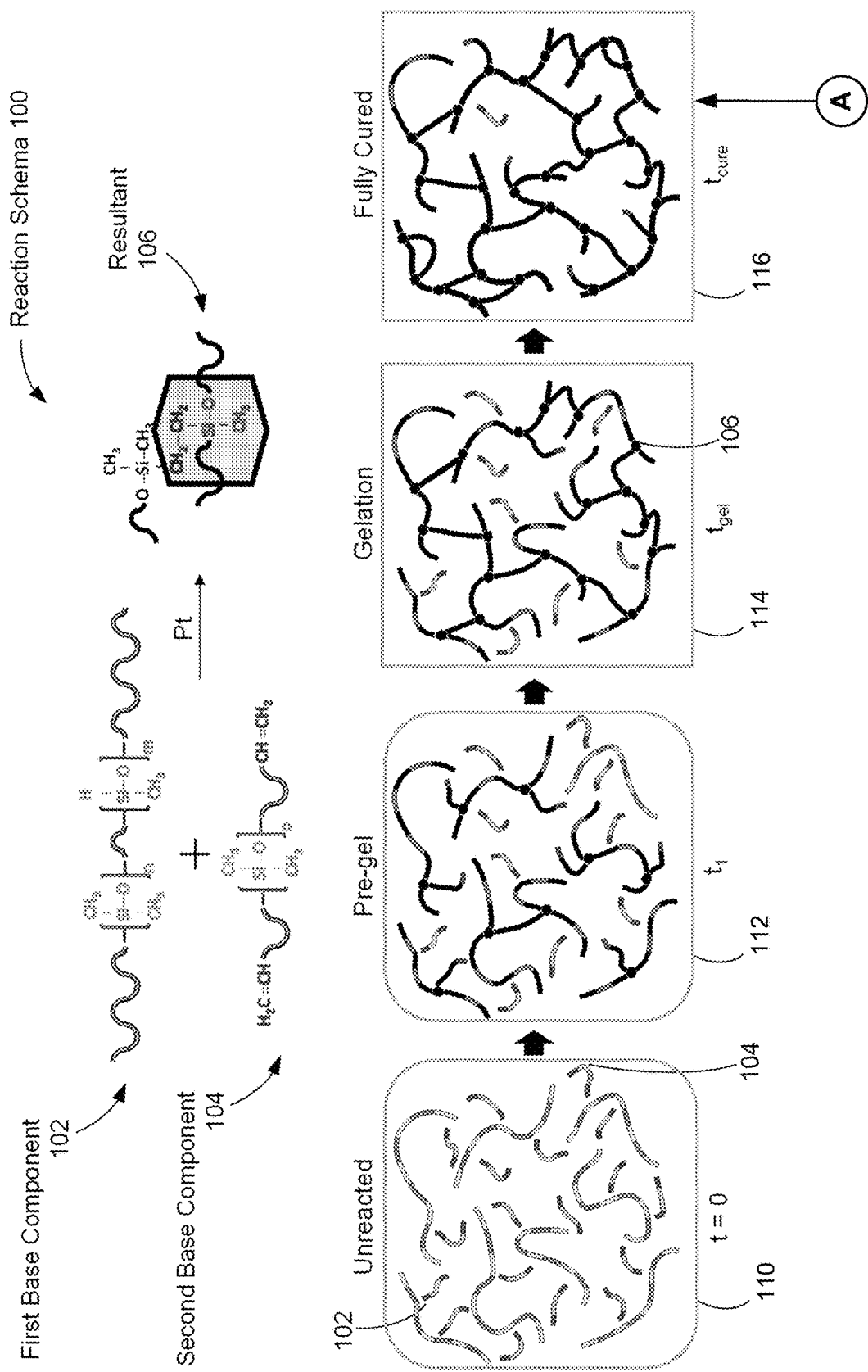
FIG. 1 shows a reaction schema for conventional silicone processing.

FIG. 1 shows a reaction schema 100 for conventional silicone processing. For ease of illustration, the second base component 104 is the red and grey component in FIG. 1 and the first base component 102 is the green and grey component in FIG. 1 (e.g., as shown in step 110). Additionally, the resultant 106 is shown as the red, green, and black component in FIG. 1 (e.g., as shown in steps 112, 114, 116).

FIG. 1 shows a blended resin (in step 110) that includes a first base component 102 and a second base component 104. In the illustrated embodiment, the first base component 102 is a siloxane polymer comprising a plurality of hydride-functional group, while the second base component 104 is a siloxane polymer comprising a plurality of vinyl-functional groups. As shown at t=0 (in step 110), the first base component 102 and the second base component 104 have not reacted with each other. In other words, no crosslinks have been formed between the first base component 102 and the second base component 104. At this stage, a catalyst may or may not have already been added to the blended resin. Note that in this example, the catalyst being used is platinum (Pt).

At $t_1$ (step 112), polymerization of the first base component 102 and the second base component 104 is initiated. In other words, some crosslinks have formed between the first base component 102 and the second base component 104, although not enough to achieve gelation. At this stage, the catalyst has been added to the blended resin and some amount of time has elapsed since the catalyst was added. While not shown, the reaction in FIG. 1 is taking place at a desired temperature, which may be room temperature or some temperature near room temperature. In the reaction schema 100, the platinum (Pt) catalyst is used to trigger the reaction between the first base component 102 and the second base component 104. Once the reaction between the first base component 102 and the second base component 104 is triggered by the platinum catalyst, it is only a matter of time before the first base component 102 and the second base component 104 become fully crosslinked together. Stated differently, the reaction schema 100 lacks a mechanism to inhibit or otherwise slow the reaction between the first base component 102 and the second base component 104, once triggered.

At $t_{gel}$ (step 114), polymerization of the first base component 102 and the second base component 104 has progressed, such that the degree of crosslinking between the first base component 102 and the second base component 104 causes the first base component 102 and the second base component 104 in the blended resin to gel (e.g., have shape fixity). At this stage, if the blended resin was originally poured into a mold, the molded part could be demolded (potentially) as a result of the gelation and shape fixity. Note that as used herein, "gelation" refers to a state of a molded part where a yield stress of the mold part allows for the part to survive a demolding operation (e.g., the molded part does not tear or permanently deform in some other manner).

At $t_{cure}$ (step 116), polymerization of the first base component 102 and the second base component 104 has fully progressed. In other words, the first base component 102 and the second base component 104 are fully crosslinked together and no unreacted groups remain in either component. At this stage, the resultant 106 is formed and full mechanical properties have been obtained. In convention silicone processing (as shown in FIG. 1), the time between $t_{gel}$ and $t_{cure}$ (e.g., steps 114 and 116) is exceedingly short, which can be problematic if the presence of unreacted groups is desired for some other processing operation (e.g., one or more lamination steps to achieve complex geometries).

Thus, while the reaction schema 100 of FIG. 1 works in some processing situations, the schema 100 is incompatible in other processing situations (e.g., when a large time period between $t_{gel}$ and $t_{cure}$ is needed). One example situation may include an assembly line situation where one or more silicone components that have obtained gelation (but have not fully cured) are retrieved from a stock pile and are subsequently processed (fully cured), e.g., during a lamination step. The reaction schema 100 of FIG. 1 simple could not be used in this example situation as silicone components made using the schema 100 would fully cure while in the stock pile (i.e., no unreacted groups would remain), and, thus, no subsequent bonding or laminating could be achieved. Nevertheless, the reaction schema 200 below uses an inhibitor to dramatically increase the time period between $t_{gel}$ and $t_{cure}$. In doing so, unreacted groups remain present in a gelled component for a significant period of time, allowing for various processing techniques, which are typically only applied to thermoplastic materials, to be applied to a thermosetting material. For example, the reaction schema 200 allows for the creation of thermoset polymer articles using vacuum bagging, vacuum forming, thermoforming, and compression molding, among others.

Figure 2:
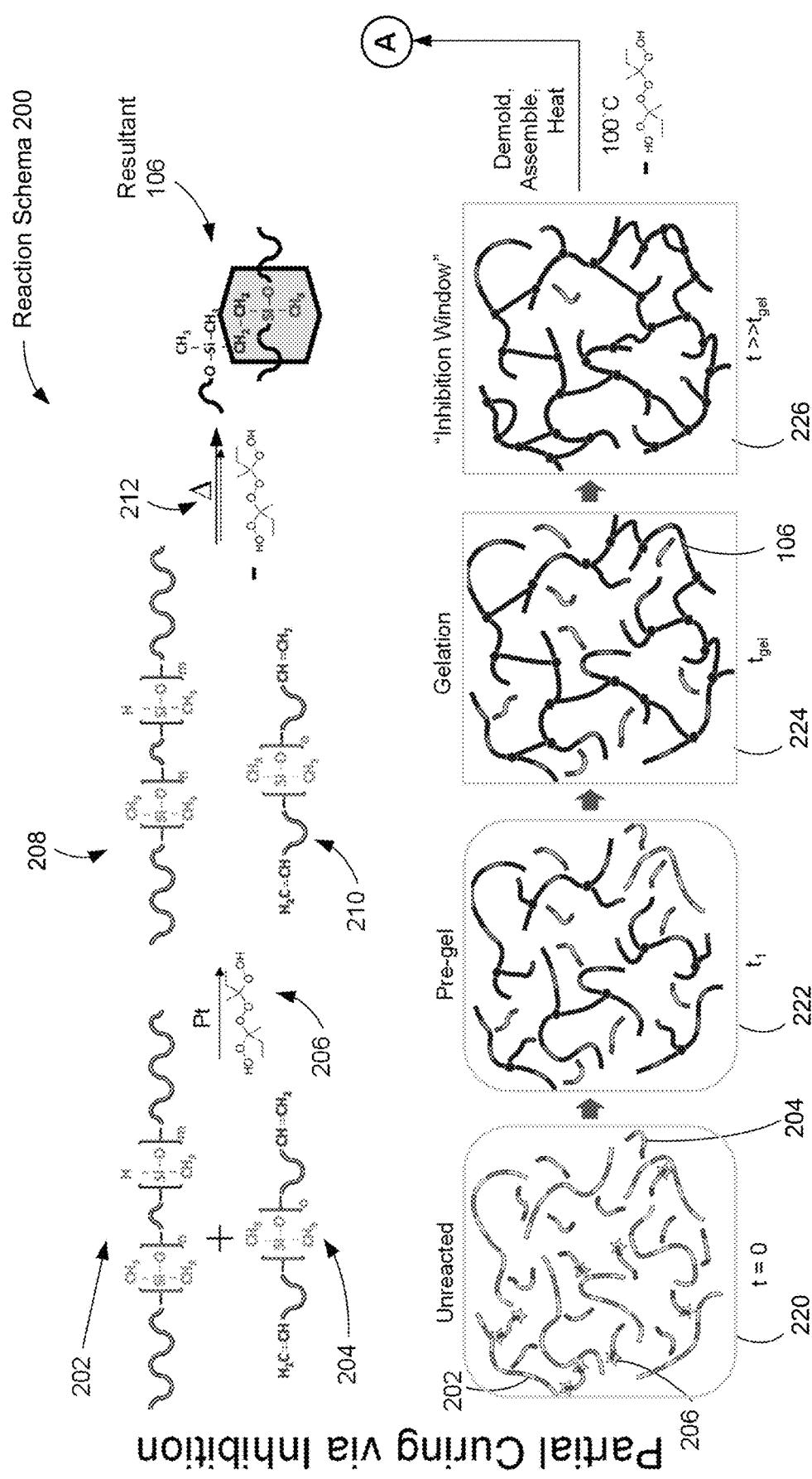
FIG. 2 shows a reaction schema for silicone processing using temporary inhibition in accordance with some embodiments.

FIG. 2 shows a reaction schema 200 for silicone processing using temporary inhibition in accordance with some embodiments. For ease of illustration, the inhibitor 206 is shown as a star in FIG. 2, the second base component 204 is the red and grey component in FIG. 2 (e.g., in step 220), and the first base component 202 is the green and grey component in FIG. 2 (e.g., in step 220). Additionally, the resultant 106 is shown as the red, green, and black component in FIG. 2 (e.g., in steps 222, 224, 226).

FIG. 2 shows a blended resin (in step 220) that includes a first base component 202, a second base component 204, and an inhibitor 206 (sometimes referred to herein as a "chemical agent" or "chemical additive"). In the illustrated embodiment, the first base component 202 is a siloxane polymer comprising a plurality of hydride-functional group, while the second base component 204 is a siloxane polymer comprising a plurality of vinyl-functional groups. In some other embodiments, the first and second base components may be different siloxane polymers. Moreover, the first and second base components may be the parts various off the shelf room-temperature vulcanizing silicones, along with other types of commonly used silicones. It is also noted that the discussion herein is not limited to two-part silicones. Rather, the reaction schema 200 can be equally applied to three-part silicones, four-part silicones, and so on.

In some embodiments, the inhibitor 206 is a hydroperoxide inhibitor. As one example, the hydroperoxide inhibitor may a methyl ethyl ketone peroxide (e.g., Peroxan ME, Luperox DDM-9). The inhibitor 206 may be some other inhibitors as well, such as an alcohol-based inhibitor. In some embodiments, between 0.0001% and 0.5% by weight of the inhibitor 206 is added to the blended resin (e.g., immediately after (or during) mixing of the first base component 202 and the second base component 204). In some embodiments, a percentage by weight of the inhibitor 206 in the blended resin is positively related to a Young's modulus (and/or shore hardness) of a resulting silicone article. In other words, fully cured silicones with a high Young's modulus (and/or a high shore hardness) may require a greater percentage of the inhibitor 206 in the blended resin, as compared to fully cured silicones with a lower Young's modulus (and/or a lower shore hardness). In some embodiments, prior to combining with the siloxane precursors, the inhibitor is diluted into a solvent. In some embodiments, dilution into a solvent aids in mixing.

Other suitable inhibitors are known in the art. U.S. Pat. No. 4,061,609 for example discloses an "Inhibitor for platinum catalyzed silicone rubber compositions," and identifies the inclusion of the family of hydroperoxide inhibitors for shelf stability for premixed AB silicone systems. Different hydroperoxides have different inhibition performances. Hydroperoxides (ROOH) previously used include tertbutylhydroperoxide (commercial product: Peroxan BHP 70 and Peroxan BHP 10), diisopropylbenzen-mono-hydroperoxide (Peroxan IHP-50), p-menthan hydroperoxide (Peroxan PAM), cumyl hydroperoxide (Peroxan CU-90L and Peroxan CU-80L), 1,1,3,3-tetramethylbutyl hydroperoxide (Peroxan OHP), tert-amyl hydroperoxide (Peroxan AHP), etc. In some embodiments, the inhibitor is methyl ethyl ketone peroxide (Peroxan ME, Luperox DDM-9). The choice of hydroperoxide determines the temperature/rate at which the inhibitor decomposes. In some embodiments, the inhibitor decomposes at a temperature higher than 100° C., but lower than 200° C.

U.S. Pat. No. 3,445,420 discloses "Acetylenic inhibited platinum catalyzed organopolysiloxane composition," and identifies acetylenic alcohols as another family known to inhibit hydrosilylation reactions as long as the composition is sealed from air (likely due to evaporation of the acetylenic alcohol). These include, without limitation, methylisobutynol, 2-ethynyl isopropanol, 3,5 dimethyl-1-hexyne-3-ol, isopropenyl acetylene, 2-ethynyl butane-2-ol, 1-ethnyl-1-cyclohexanol, propynole, butynol, hexynediol, ethyloctinaol, ethinyl cyclohexanol, methylbutynol, tetramethyldecinediol, dimethylhexynediol, butynediol, 3,4, trimethyl-1-dodecin-3-ol, trimethylsilyl-2-propyn-1-ol. In some embodiments, an inhibitor is trimethylsilyl-2-propyn-1-ol.

At room temperature, the inhibitor 206 is configured to react with, or otherwise block from reacting one of the base components. For example, in the illustrated embodiment, the inhibitor 206 is configured to react with, or block the plurality of vinyl-functional groups of the second base component 204. Importantly, even with the inhibitor 206 reacting with, or blocking the plurality of vinyl-functional groups of the second base component 204 and/or any catalyst present, an article made from the blended resin is still able to reach gelation at room temperature. Moreover, the inhibitor 206 is also configured to decompose or otherwise be removed from the mixture when heated to some predefined temperature that is greater than room temperature. For example, the predefined temperature can range from approximately 90 degrees Celsius to 200 degrees Celsius. Accordingly, if the blended resin (once gelled) remains at room temperature, the inhibitor 206 inhibits the article from reaching full cure.

As shown at t=0 (in step 220), the first base component 202 and the second base component 204 have not reacted with each other. In other words, no crosslinks have been formed between the first base component 202 and the second base component 204. At this stage, a catalyst (e.g., platinum (Pt)) may or may not have already been added to the blended resin. Note that, at this stage, the inhibitor 206 has already started reacting with, or otherwise blocking some of the plurality of vinyl-functional groups of the second base component 204 and/or any catalyst present, as indicated by the stars 206 attached to ends of the red and gray components 204 in step 220's illustration.

At $t_1$ (step 222), polymerization of the first base component 202 and the second base component 204 is initiated. Consequently, some crosslinks have been formed between the first base component 202 and the second base component 204 (but not enough to achieve gelation). At this stage, the catalyst has been added to the blended resin and some threshold amount of time has elapsed since the catalyst was added. While not shown, the reaction in FIG. 2 is taking place at some initial temperature (e.g., room temperature). In the reaction scheme 200, the platinum (Pt) catalyst is used to trigger the reaction between the first base component 202 and the second base component 204. Crosslinking between the first base component 202 and the second base component 204 in step 222 (and 224) is sometimes referred to herein as an initial crosslinking reaction, a first crosslinking reaction, or an inhibited crosslinking reaction. "Inhibited crosslinking reaction" is used because the inhibitor 206 inhibits the initial crosslinking reaction by reacting with or otherwise blocking the second base component 204 and/or the catalyst.

Also in step 222, the reaction between the inhibitor 206 and the second base component 204 has progressed further, such that the inhibitor 206 has continued to react with the plurality of vinyl-functional groups of the second base component 204, as indicated by the stars 206 attached to ends of the red and gray components 204 in step 222's illustration. Unlike the convention silicone processing shown in FIG. 1, the reaction between the first base component 202 and the second base component 204 triggered by the platinum (Pt) catalyst in FIG. 2 does not quickly proceed to full cure. Rather, the reaction between the first base component 202 and the second base component 204 stalls as a result of the inhibitor 206 bonding with, or otherwise blocking the second base component 204 (i.e., the inhibitor 206 occupies or blocks a threshold number of the second base component 204's bond sites).

At $t_{gel}$ (step 224), polymerization of the first base component 202 and the second base component 204 has progressed, such that the degree of crosslinking between the first base component 202 and the second base component 204 causes the first base component 202 and the second base component 204 in the blended resin to gel (e.g., have shape fixity). As this stage, if the blended resin was originally poured into a mold, the molded part could be demolded as a result of the gelation and shape fixity. Notably, the amount of the inhibitor 206 in the blended resin, and also the type of inhibitor 206 used, is specifically chosen to allow for the first base component 202 and the second base component 204 in the blended resin to obtain a desired degree of gelation (e.g., have a yield stress to survive a demolding operation), but not progress past the desired degree of gelation. In this way, a molded part under the reaction schema 200 can be demolded, and the time window for said demolding is substantial (discussed below). Furthermore, the molded part also includes a sufficient number of unbonded functional groups so that satisfactory crosslinking can occur during a subsequent crosslinking reaction, which ensures that the mechanical properties of the final article are not compromised by inclusion of the inhibitor 206. For example, a number of unreacted groups from the plurality of vinyl-functional groups and the plurality of hydride-functional groups remain at step 224.

Step 226 is referred to herein as the "inhibition window," and during this window, polymerization of the first base component 202 and the second base component 204 remains substantially the same as the polymerization shown at step 224 (e.g., polymerization is essentially stalled). In other words, a gelled part made from the first base component 202 and the second base component 204 remains in a partially-cured state. The inhibition window corresponds to the time period between $t_{gel}$ and $t_{cure}$ (i.e., the time period in which a partially-cured state is maintained). Notably, using the reaction schema 200, this time period is orders of magnitude larger than the time period between $t_{gel}$ and $t_{cure}$ in FIG. 1 (e.g., the inhibition window may be hundreds, if not thousands, of times longer than the time period between $t_{gel}$ and $t_{cure}$ in FIG. 1). As such, a gelled part (molded or demolded), if maintained at the first desired temperature (e.g., room temperature), will remain in a gelled state (i.e., a partially-cured state) for a significant period of time. Because of this, a gelled part made using the reaction schema 200 can be assembled with like parts (i.e., other parts using the reaction schema 200), different parts (e.g., other parts not made using the reaction schema 200, such as parts made using the reaction schema 100 in FIG. 1), or can be further mechanically manipulated and cured on its own at some later time. For example, a gelled part made using the reaction schema 200 can be thermoformed.

The key here is that, in the partially-cured state, a gelled part made using the reaction schema 200 will include: (i) a number of groups from the plurality of vinyl-functional groups that have reacted with a number of groups from the plurality of hydride-functional groups, and (ii) a number of groups from the plurality of vinyl-functional groups that have reacted with, or otherwise have been blocked by the inhibitor 206. As a result, the gelled part will also include a number of groups from the plurality of hydride-functional groups that have been unable to react with vinyl-functional groups, due to the inhibitor 206 temporarily occupying or blocking those bond sites. Furthermore, as mentioned above, the inhibitor 206 is configured to decompose or otherwise be removed (i.e., detach or be removed from vinyl-functional groups) when heated above or to a predefined temperature (e.g., approximately 100 degrees Celsius). According, heating a gelled component made using the reaction schema 200 above the predefined temperature releases the number of groups from the plurality of vinyl-functional groups that originally reacted with the inhibitor 206 (e.g., in steps 220, 222, and 224), which allows those newly freed vinyl-functional groups to bond with available hydride-functional groups (e.g., unbonded hydride-functional groups from the first base component or, potentially, unbonded hydride-functional groups from some other base component, such as a base component in another gelled component).

In short, at step 226, polymerization of the first base component 202 and the second base component 204 will proceed to completion when heated to the predefined temperature. Such heating causes the inhibitor 206 to at least partially decompose, which triggers a subsequent crosslinking reaction between the first base component 202 and the second base component 204 (also called an uninhibited crosslinking reaction). Once triggered, the first base component 202 and the second base component 204 become fully crosslinked together and no unreacted groups remain (or some insignificant number of unreacted groups remain). At this stage, the resultant 106 is formed and full mechanical properties have been obtain (go to step 116 in FIG. 1). In some embodiments, a final product made from the reaction schema 200 will include reaction products from the decomposed inhibitor 206. However, the reaction products from the decomposed inhibitor 206 do not degrade or otherwise affect the mechanical properties (and potentially thermal properties and other properties) of the final product, as discussed below with reference to FIG. 3.

As one example, the blended resin may be poured into a mold at room temperature to create a thin film. At step 224, the thin film, now gelled, is removed from the mold while still at room temperature. Subsequently, the thin film is placed on a three-dimensional (3D) object, placed under vacuum, and heated above the predefined temperature. Heating the thin film releases a number of groups from the plurality of vinyl-functional groups that originally reacted with, or were blocked by the inhibitor 206 (e.g., in steps 220, 222, and 224), which allows those newly freed vinyl-functional groups to bond with unbonded hydride-functional groups from the plurality of hydride-functional groups during a crosslinking reaction. Once the crosslinking reaction is finished, the thin film is transformed into a fully cured 3D article that has a shape of the 3D object.

Figure 3:
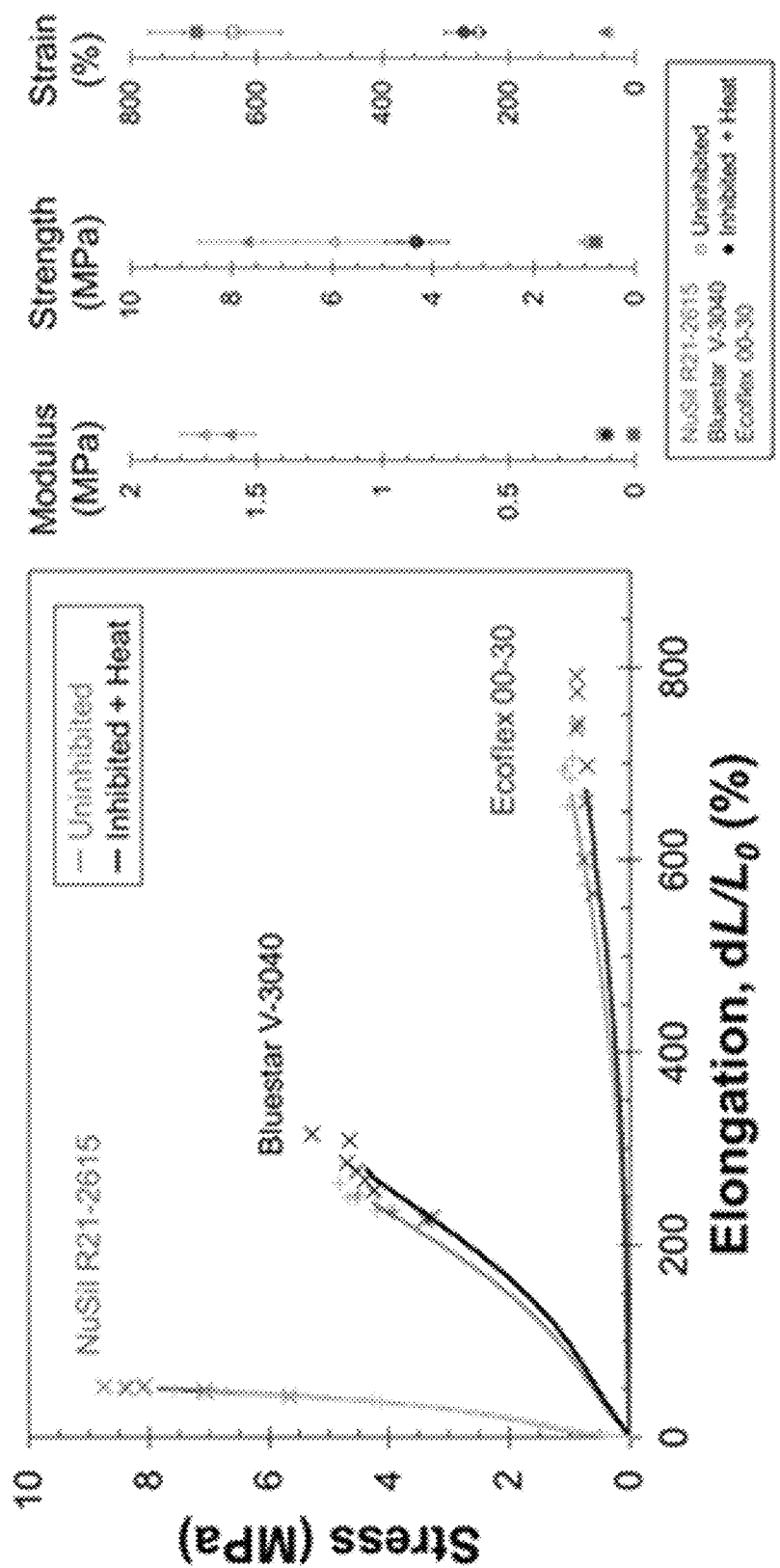
FIG. 3 shows mechanical properties data of fully cured uninhibited and inhibited silicones in accordance with some embodiments.

FIG. 3 shows mechanical properties data of fully cured uninhibited and inhibited silicones in accordance with some embodiments. Stated differently and with reference to FIGS. 1 and 2, FIG. 3 shows mechanical properties data of different silicones made using the reaction schema 100 and the reaction schema 200. As shown, three different two-part silicones are evaluated in FIG. 3, whereby each of the two-part silicones has two sets of data: (i) data when uninhibited and (ii) data when inhibited (e.g., using the inhibitor 206, FIG. 2). Notably, the two sets of data for each of the two-part silicones are substantially similar, which confirms that the inhibitor 206 does not materially degrade or otherwise affect the properties of the final product (across various silicones).

In the discussion below, two silicone substrates are cohesively bonded together across a contact interface to form a polymer article. The contact interface includes chemical crosslinks between the first silicone substrate and the second silicone substrate such that a strength of the polymer article across the contact interface is substantially equal to a strength of the first silicone substrate or the second silicone substrate alone. As one example, the thermal properties are the same, which allows for the polymer article to be placed in high heat environments, which typically could not be accomplished in the past when adhesives were used to bond two silicones substrates together, as most adhesives have a lower heat resistance than silicones.

In some embodiments, a silicone substrate is bonded to another silicone substrate according to a plasma bonded strategy described herein or an inhibition bonded strategy described herein. The subsequent sample is placed in an autoclave for a period of time. Samples were then subjected to 90 degree peel tests. The plasma bonded samples exhibit a weaker bond strength which then degrades rapidly with time, whereas the inhibition bonded samples maintain the same strength over at least 30 hours in the autoclave (134° C. pressurized saturated steam).

Figure 4A:
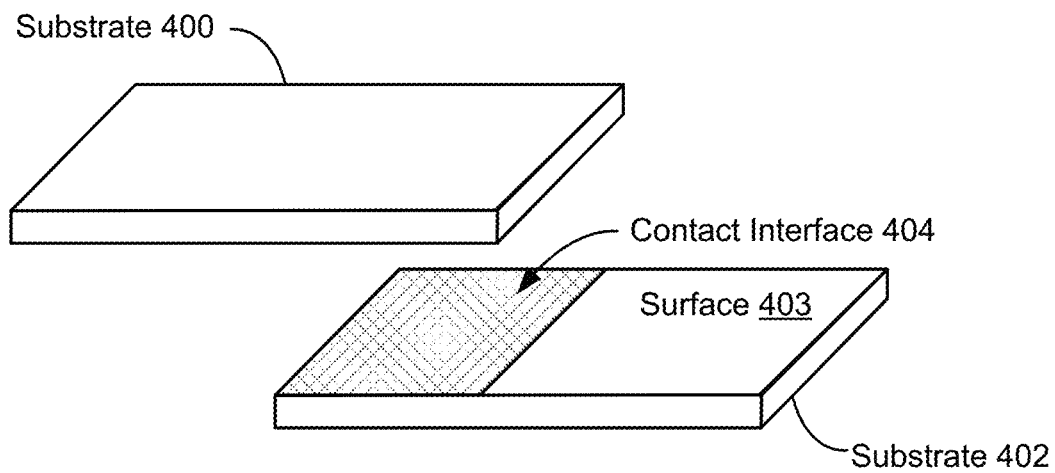
FIGS. 4A and 4B show how two silicones substrates can be bonded together using the reaction schema of FIG. 2 in accordance with some embodiments.
Figure 4B:
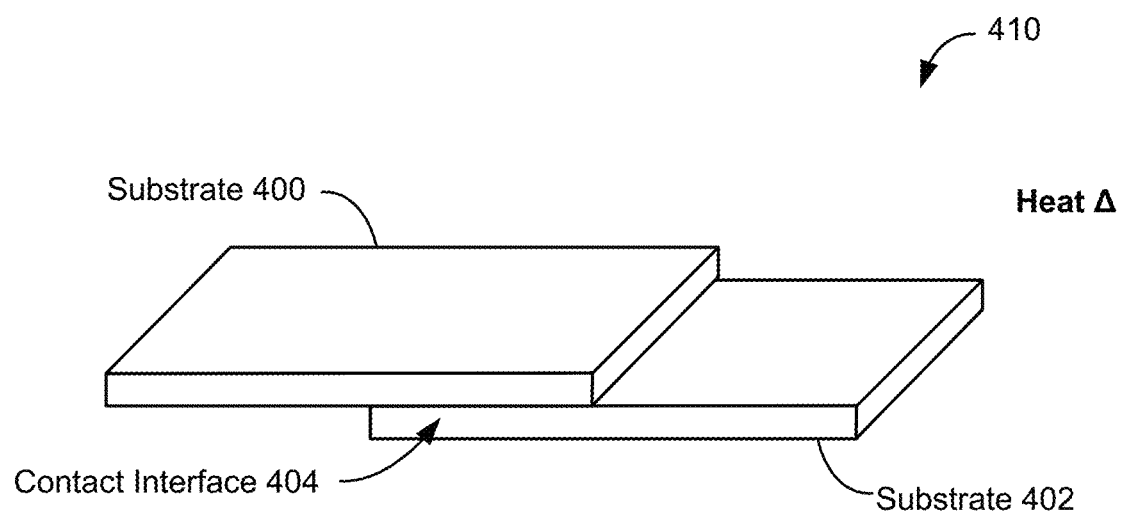

FIGS. 4A and 4B show how two silicones substrates can be bonded together using the reaction schema 200 in accordance with some embodiments. More specifically, at least in FIG. 4A, a first substrate 400 and a second substrate 402 are partially-cured silicones, meaning that the substrates (i) have undergone an initial crosslinking reaction separately and (ii) include unreacted functional groups (and/or functional groups that are temporarily blocked by the inhibitor 206). In some embodiments, the first substrate 400 and the second substrate 402 are made using the reaction schema 200. In such embodiments, the first substrate 400 and the second substrate 402 as shown in FIG. 4A are in the partially-cured state shown in step 226 of FIG. 2 (i.e., the inhibition window). Alternatively, in some embodiments, only one of the first substrate 400 and the second substrate 402 is made using the reaction schema 200 (e.g., one substrate is made using the reaction schema 100, or some other reaction schema). In such embodiments, in FIG. 4A, one of the substrates may be in the state shown at step 226 (FIG. 2) while the other substrate may be in the state shown at step 114 (FIG. 1).

In FIG. 4B, the first substrate 400 is placed in contact with a surface 403 of the second substrate 402, thereby forming a contact interface 404 between the first substrate 400 and the second substrate 402. Once placed in contact with each other, the first substrate 400 and the second substrate 402 are heated (e.g., globally) to at least a predefined temperature, which causes the inhibitor 206 in the first substrate 400 and/or the second substrate 402 to decompose, thereby freeing one or more functional groups in the first substrate 400 and/or the second substrate 402 (as explained above with reference to FIG. 2). At this stage, unreacted functional groups (and/or newly freed functional groups) in the first substrate 400 cohesively bond (i.e., crosslink) with unreacted functional groups (and/or newly freed functional groups) in the second substrate 402 across the contact interface 404. In other words, the heating results in the first substrate 400 and the second substrate 402 cohesively bonding together across the contact interface 404 to form a unitary resulting part 410. Notably, a strength of the resulting part 410 across the contact interface 404 is substantially equal to a strength of the first substrate 400 or the second substrate 402 alone (e.g., a tensile strength of the resulting part 410 across the contact interface 404 is within 90% of the tensile strength of the substrates alone) (90 degree peel test). Furthermore, because crosslinking of two partially-cure silicone substrate is achieved, the high strength of the resulting part 410 across the contact interface 404 is achieved without the use of chemical adhesives (or some other surface treatment). Additionally, a thermal resistance of the resulting part 410 across the contact interface 404 is substantially the same as a thermal resistance of the resulting part 410 as a whole. Consequently, the resulting part 410 can undergo various heat treatments (e.g., a heat sterilizing operation).

To further illustrate, the first silicone substrate 400 may be formed from (i) a first siloxane polymer comprising a first plurality of hydride-functional groups and (ii) a second siloxane polymer comprising a first plurality of vinyl-functional groups. Furthermore, the second silicone substrate 402 may be formed from (i) a third siloxane polymer comprising a second plurality of hydride-functional groups and (ii) a fourth siloxane polymer comprising a second plurality of vinyl-functional groups. With these compositions involved, the contact interface 404, which is again formed between the first and second silicone substrates, can include chemical crosslinks between the first siloxane polymer and the fourth siloxane polymer. More specifically, if the second silicone substrate 402 included the inhibitor 206, then the contact interface 404 includes chemical crosslinks between some of the first plurality of hydride-functional groups and some of the second plurality of vinyl-functional groups (whereby the inhibitor 206 was originally linked with some of the second plurality of vinyl-functional groups before the heating operation). In this example, the contact interface 404 may also include chemical crosslinks between the second siloxane polymer and the third siloxane polymer.

Figure 5A:
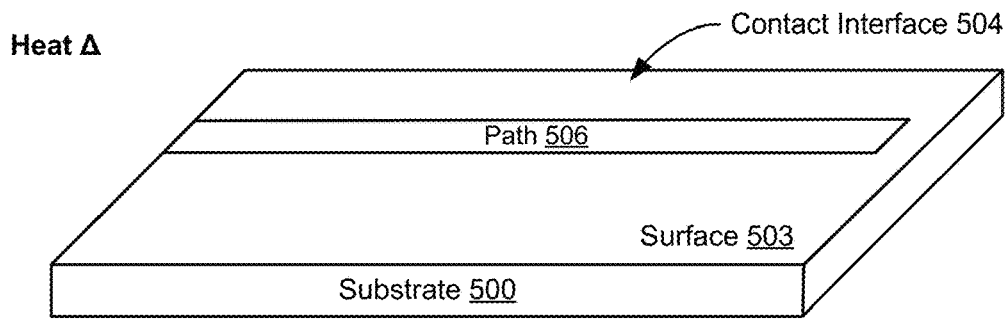
FIGS. 5A through 5C show how the reaction schema of FIG. 2 can be leveraged to create air channels in a polymer part in accordance with some embodiments.
Figure 5B:
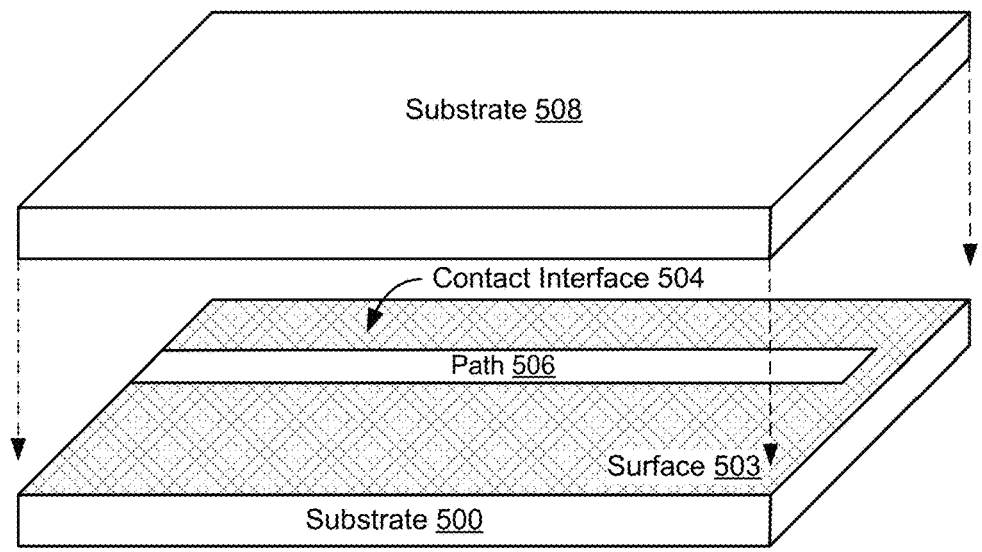
Figure 5C:
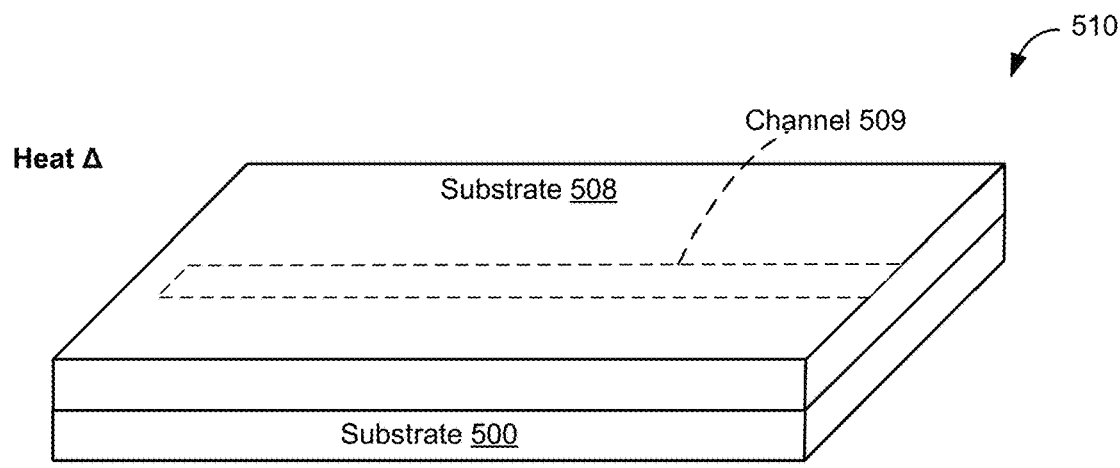

FIGS. 5A through 5C show how the reaction schema 200 can be leveraged to create air channels in a polymer part in accordance with some embodiments. More specifically, the first substrate 500 is made using the reaction schema 200. Furthermore, in FIG. 5A, the first substrate 500 is in a partially-cured state (e.g., it is at step 226), meaning that the first substrate 500 (i) has undergone an initial crosslinking reaction and (ii) includes one or more unreacted functional groups (and/or one or more functional groups that are temporarily blocked by the inhibitor 206). In addition, the first substrate 500 includes a path 506 defined in its surface 503. The path 506 is created by selectively heating the first substrate 500 along the path 506, which causes the inhibitor 206 along the path 506 to decompose and portions of the first substrate 500 along the path 506 to cure. As such, and unlike the remainder of the first substrate 500, which is partially cured, the path 506 is fully cured. In some embodiments, a laser (e.g., a computer-controlled laser) is used to perform the selective heating.

In FIG. 5B, a second substrate 508 is placed in contact with the surface 503 of the first substrate 500, thereby forming a contact interface 504 between the first substrate 500 and the second substrate 508. Like the first substrate 500, the second substrate 508 may be made using the reaction schema 200. In such embodiments, the second substrate 508 has undergone an initial crosslinking reaction and includes unreacted functional groups (and/or functional groups that are temporarily blocked by the inhibitor 206). Alternatively, the second substrate 508 may be a silicone substrate made using some other process, such as the reaction schema 100. Whichever the case, the second substrate 508 is in a partially-cured state in FIG. 5B. Notably, the path 506 defined in the surface 503 of the first substrate 500 is within the contact interface 504 formed between the first substrate 500 and the second substrate 508.

Once placed in contact with each other, the first substrate 500 and the second substrate 508 are heated (e.g., globally) to at least a predefined temperature (as shown in FIG. 5C), which causes the inhibitor 206 in the first substrate 500 (and, potentially, in the second substrate 508) to decompose, thereby freeing functional groups in the first substrate 500 (and, potentially, the second substrate 508), as explained above with reference to FIG. 2. At this stage, unreacted functional groups (and/or newly freed functional groups) in the first substrate 500 cohesively bond (i.e., crosslink) with unreacted functional groups (and/or newly freed functional groups) in the second substrate 508 across the contact interface 504. In other words, the heating results in the first and second substrates 500, 508 cohesively bonding together across the contact interface 504 to form a single unitary part 510, as explained above with reference to FIGS. 4A and 4B.

However, heating the first and second substrates 500, 508 to the predefined temperature does not cause bonding of the first and second substrates along the path 506 as that portion of the first substrate 500 was previously cured prior to the global heating. Stated differently, the portion of the first substrate 500 along the path 506 does not include any unreacted functional groups or newly freed functional groups that result from the heating operation in FIG. 5C. As such, while portions of the first substrate 500 around (bordering) the path 506 cohesively bond with corresponding portions of the second substrate 5008, an unbonded channel 509 is formed between the first and second substrates at the path 506's location within the contact interface 504.

In some embodiments, the unbonded channel 509 is fluidically coupled to a pressure/fluid source, such as a pneumatic pressure source, that is configured to inject a fluid into the unbonded channel 509. Furthermore, the first and second substrates 500, 508 of the part 510 may be made from the same or different elastic polymers. In such circumstances, injecting the fluid into the unbonded channel 509 causes the channel 509 to expand and, in turn, the part 510 to move (e.g., curl in a preferred direction). Note that the design of the path 506 (and the channel 509) is simplified in FIGS. 5A-5C for ease of illustration. In practice, any number of path designs are possible, especially in view of a computer-controlled laser being used to selectively heat the substrate 500 (FIG. 5A).

Figure 6A:
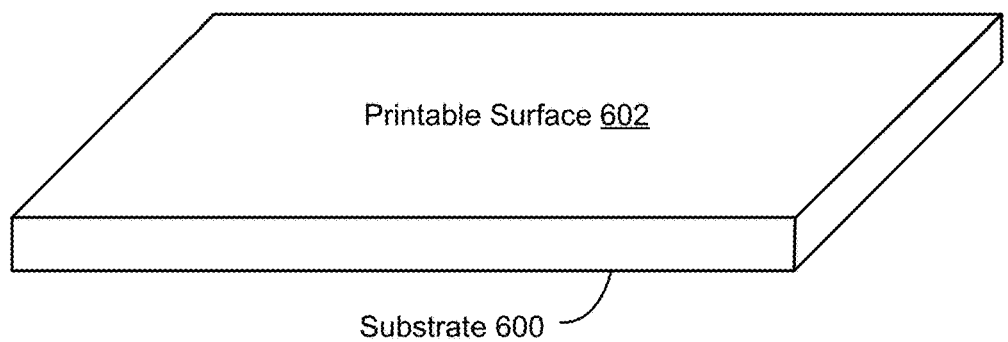
FIGS. 6A through 6C show how two substrates can be bonded together using the reaction schema of FIG. 2 in accordance with some embodiments.
Figure 6B:
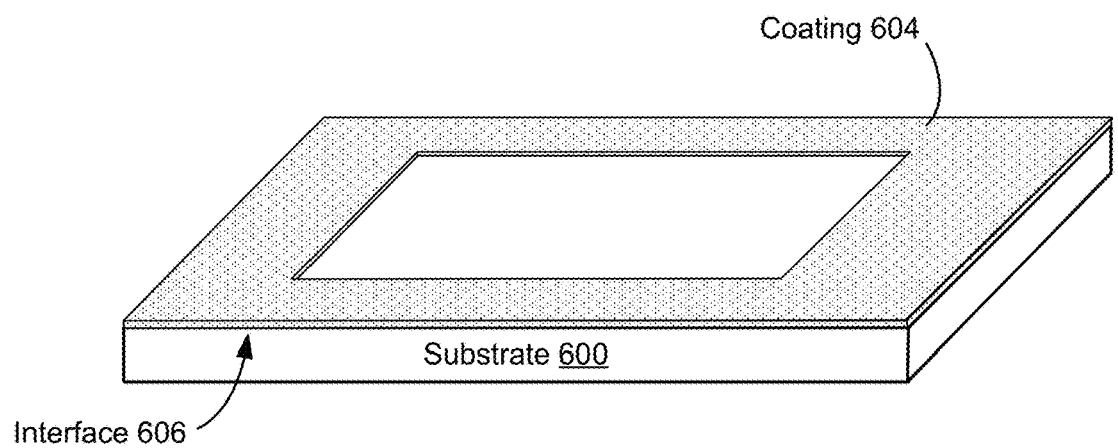
Figure 6C:
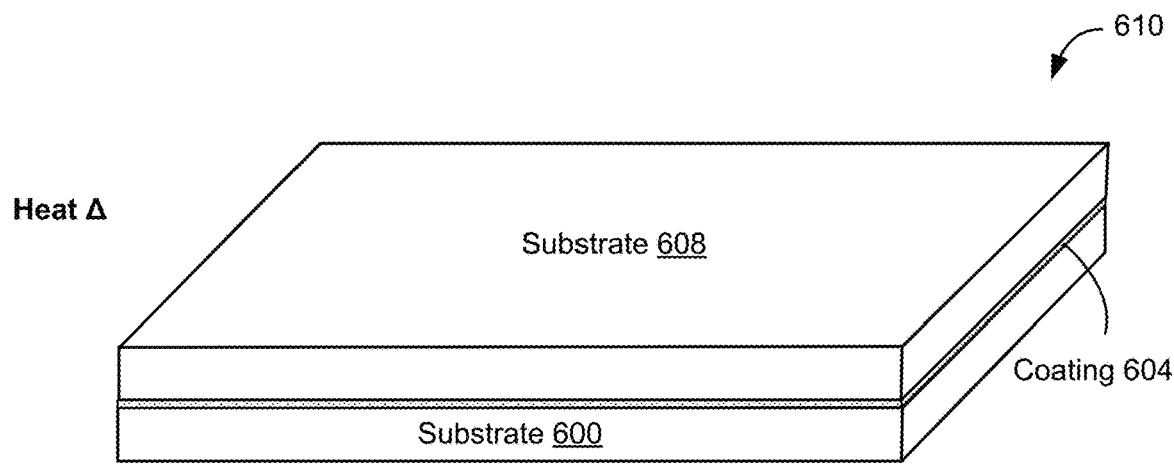

FIGS. 6A through 6C show how two substrates can be bonded together using the reaction schema 200 in accordance with some embodiments. In particular, FIGS. 6A through 6C show how a silicone coating 604, made using the reaction schema 200, printed (and otherwise positioned) onto a first silicone substrate 600 can cohesively bond (selectively) the first substrate 600 to a second substrate 608. Like the previous examples, the first substrate 600 and/or the second substrate 608 are partially-cured silicones (at least in FIGS. 6A and 6B), meaning that the substrates (i) have undergone an initial crosslinking reaction separately and (ii) include unreacted functional groups (and/or functional groups that are temporarily blocked by the inhibitor 206). Furthermore, the first and second substrates 600, 608 may or may not be made using the reaction schema 200. Additionally, the first substrate 600 may be made from a first two-part silicone while the second substrate 600 may be made from a second two-part silicone that is different from the first two-part silicone. In such circumstances, the first and second substrates may possess different optical, mechanical, electrical, etc. properties (once fully cured).

As shown in FIG. 6A, the first substrate 600 includes a printable surface 602. Furthermore, as shown in FIG. 6B, the coating 604 is deposited onto the printable surface 602 in a pattern, creating a contact interface 606 between the coating 604 and the first substrate 600. In some embodiments, the coating 604 is deposition onto the first substrate 600 using a printing process, such as Direct Ink Writing (DIW) 3D printing or the like. In other embodiments, the coating 604 is a thin film made during a casting operation. In such embodiments, the coating 604 is placed onto the printable surface 602 (e.g., using a pick-and-place machine, or by a human operator).

At this stage, the coating 604 and the first substrate 600 are in partially-cured states, such that each has achieved gelation while maintaining a desired number of unreacted functional groups, as explained above with reference to FIG. 2. Also, the coating 604 and the first substrate 600 may have both experienced some initial crosslinking across the contact interface 606 (as well as some initial crosslinking within their respective cross-sections to achieve gelation). Note in FIG. 6B that the coating 604 and the first substrate 600 are at room temperature.

In FIG. 6C, a second silicone substrate 608 is placed in contact with the coating 604, thereby forming a contact interface between the coating 604 and the second substrate 608. Like the first substrate 600, the second substrate 608 may be made using the reaction schema 200. In such embodiments, the second substrate 608 has undergone an initial crosslinking reaction and includes unreacted functional groups (and/or one or more functional groups that are temporarily blocked by the inhibitor 206). Alternatively, the second substrate 608 may be a silicone substrate made using some other process, such as the reaction schema 100. Whichever the case, the second substrate 608 is in a partially-cured state when placed in contact with the coating 604.

Once placed in contact with each other, the first substrate 600, the coating 604, and the second substrate 608 are heated (e.g., globally) to a predefined temperature, as shown in FIG. 6C, which causes the inhibitor 206 in the coating 604 (and, potentially, in the first and/or second substrates) to decompose, thereby freeing functional groups in the coating 604 (as explained above with reference to FIG. 2). At this stage, unreacted functional groups (and/or newly freed functional groups) in the first substrate 600 cohesively bond (i.e., crosslink) with unreacted functional groups (and/or newly freed functional groups) in the coating 604 across the contact interface 606. Likewise, unreacted functional groups (and/or newly freed functional groups) in the second substrate 608 cohesively bond (i.e., crosslink) with unreacted functional groups (and/or newly freed functional groups) in the coating 604 across the contact interface between the coating 604 and the second substrate 608. In other words, the heating results in the coating 604 cohesively bonding with first and second substrates 600, 608 together across the contact interfaces to form a single unitary part 610, as explained above with reference to FIGS. 4A and 4B.

In some instances, the discussion in FIGS. 6A-6C can be used to bond two silicone substrates that are made from different materials. In other words, the first substrate 600 is a first silicone while the second substrate 608 is a second silicone that does not bond well to the first silicone alone. In such cases, the coating 604 acts as the bridge between the two substrates, and allows the first substrate 600 and the second substrate 608 to be cohesively bonded together via the coating 604 and obtain improved mechanical properties.

Figure 7A:
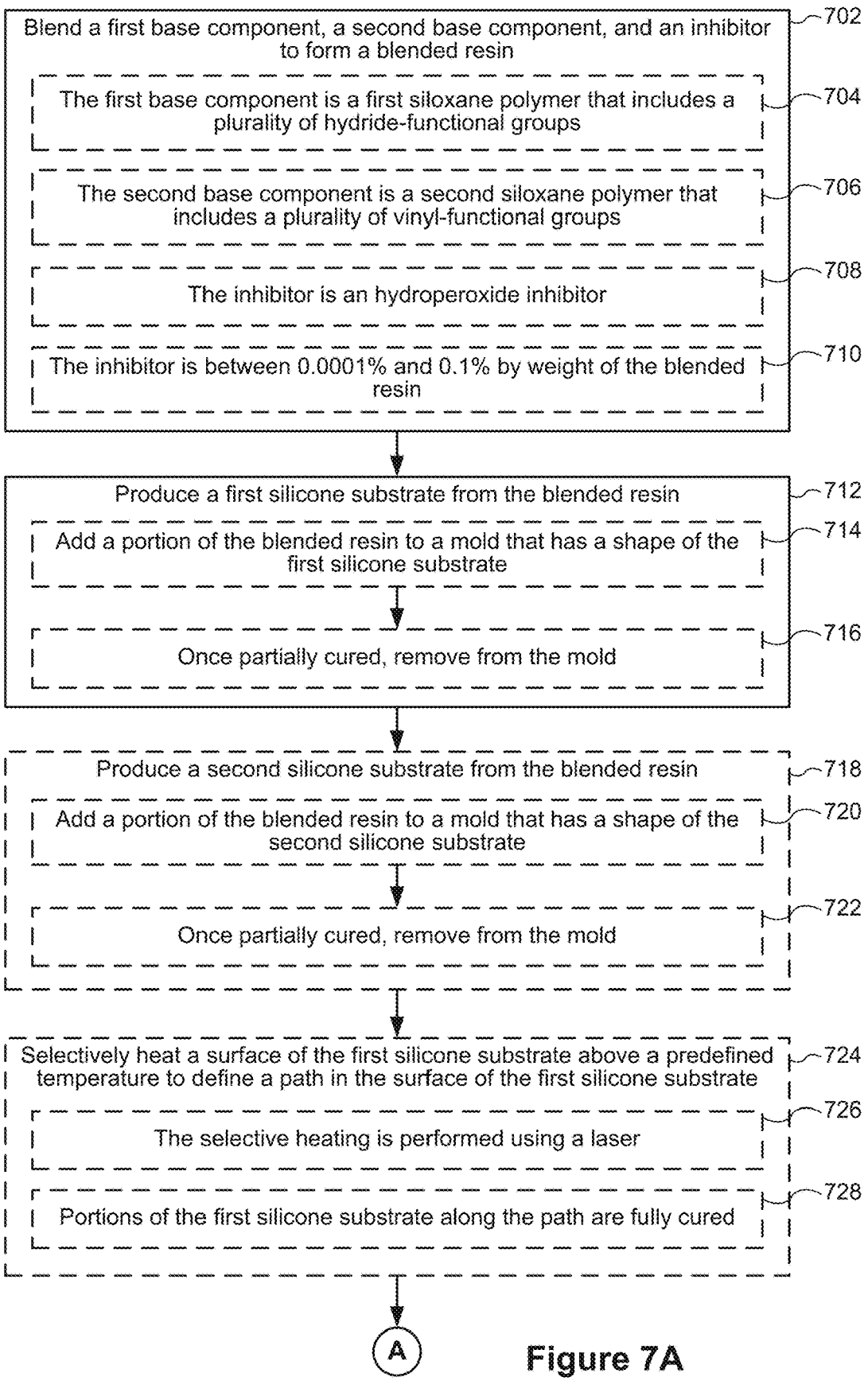
FIGS. 7A-7B show a flowchart of a method for creating a unitary silicone component in accordance with some embodiments.
Figure 7B:
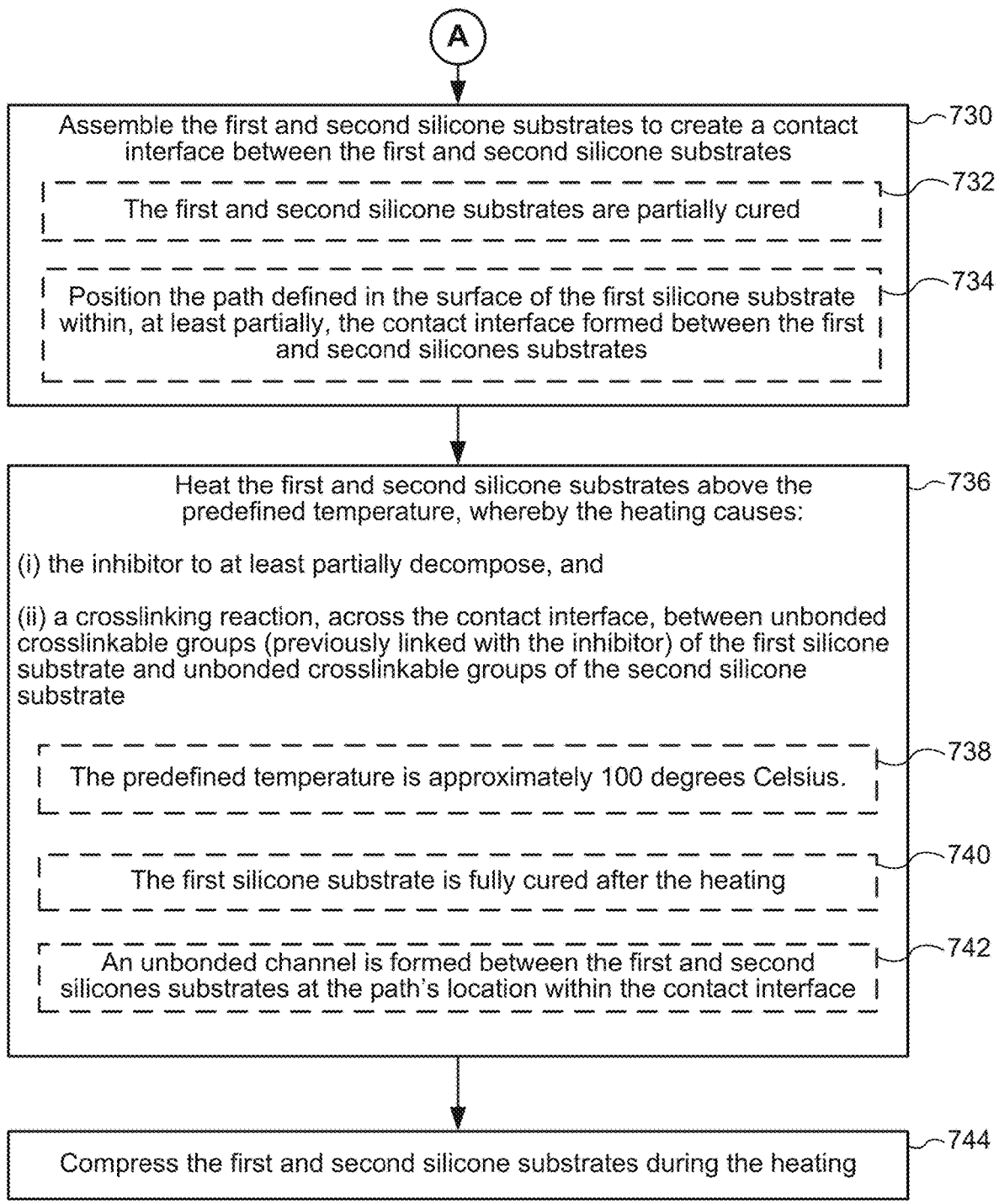

FIGS. 7A-7B show a flowchart of a method 700 for creating a unitary silicone component/part in accordance with some embodiments. The method 700 includes blending (702) a first base component (e.g., first base component 202, FIG. 2), a second base component (e.g., second base component 204, FIG. 2), and an inhibitor (e.g., inhibitor 206, FIG. 2) to form a blended resin (e.g., blended resin shown in step 220, FIG. 2). In some embodiments, the blending is performed using centrifugation. For example, the first base component, the second base component, and the inhibitor may be added together in a high shear mixer at approximately 2000 rpm for at least 30 seconds. In some embodiments, the first base component is a first siloxane polymer that includes a plurality of hydride-functional groups (704). Moreover, in some embodiments, the second base component is a second siloxane polymer that includes a plurality of vinyl-functional groups (706). As explained above with reference to FIG. 2, the inhibitor may be an hydroperoxide inhibitor, such as a methyl ethyl ketone peroxide (708). In some embodiments, the inhibitor is between 0.0001% and 0.1% by weight of the blended resin (710). Note that during the blending (702), the blended resin is not exposed to an elevated temperature. In other words, the blended resin remains at or near room temperature during the blending (702) and thereafter, until a subsequent heating operation.

The amount of the inhibitor included in the blended resin is used to inhibit, to a preferred degree, a crosslinking reaction between the first base component and the second base component. As one example, the amount of the inhibitor included in the blended resin allows the crosslinking reaction between the first base component and the second base component to progress to the point at which a gelled (intermediate) part is created by the now partially bonded first and second base components. As explained above with reference to FIG. 2, bonding between the first and second base components in the gelled part has progressed to the point that the gelled part can withstand a demolding operation (e.g., the gelled part is not prone to tearing during the demolding operation).

The method 700 includes producing (712) a first silicone substrate from the blended resin. In some embodiments, producing the first silicone substrate includes adding (714) a portion of the blended resin to a mold that has a shape of the first silicone substrate. For example, the portion of the blended resin may be added to a mold in an injection molding operation, a casting operation, a 3-D printing operation, or some other manufacturing process. In some embodiments, the first silicone substrate remains in the mold until the first silicone substrate is partially cured (e.g., the portion of the blended resin in the mold reaches gelation, i.e., step 224 in FIG. 2). Once partially cured, the method 700 includes removing (716) the first silicone substrate from the mold. Again, during the producing (712), the first silicone substrate is not exposed to an elevated temperature. In some other embodiments, producing the first silicone substrate includes printing the blended resin using a 3D printing operation.

In some embodiments, the method 700 includes producing (718) a second silicone substrate from the blended resin. Producing the second silicone substrate may include adding (720) a portion of the blended resin to a mold that has a shape of the second silicone substrate. For example, the portion of the blended resin may be added to a mold in an injection molding operation, a casting operation, a 3-D printing operation, or some other manufacturing process. In some embodiments, the mold used to shape the second silicone substrate is the same as the mold used to shape the first silicone substrate. In other embodiments, the mold used to shape the second silicone substrate is different from the mold used to shape the first silicone substrate. In some embodiments, the second silicone substrate remains in the mold until the second silicone substrate is partially cured (e.g., the portion of the blended resin in the mold reaches gelation, i.e., step 224 in FIG. 2). Once partially cured, the method 700 may include removing (722) the second silicone substrate from the mold. Again, during the producing (718), the first silicone substrate and the second silicone substrate are not exposed to an elevated temperature. In some other embodiments, producing the second silicone substrate includes printing the blended resin using a 3D printing operation.

Alternatively, in some embodiments, the method 700 includes producing the second silicone substrate from some other blended resin (e.g., a blended resin that does not include the inhibitor 206). For example, the second silicone substrate may be made from the reaction schema 100 of FIG. 1. Alternatively, the second silicone substrate may be made from various other reactions. In some instances, the second silicone substrate includes one or more functional groups that are able to cohesively bond with one or more corresponding functional groups in the first silicone substrate. In some embodiments, the second silicone substrate is formed from (i) a third siloxane polymer comprising a plurality of hydride-functional groups and (ii) a fourth siloxane polymer comprising a plurality of vinyl-functional groups.

In some embodiments, the method 700 also includes selectively heating (724) a surface of the first silicone substrate above a predefined temperature (i.e., exposed a portion of the first silicone substrate to an elevated temperature) to define a path in the surface of the first silicone substrate. In such embodiments, the selective heating may be performed using a laser (e.g., a computer-controlled laser) (726). Furthermore, the selective heating causes portions of the first silicone substrate along the path to fully cure (728). For example, with reference to FIGS. 5A-5C, a surface 503 of the substrate 500 is selectively heated (e.g., using a laser) to define the path 506 in the surface 503. In this example, the selective heating heats the substrate 500 along the path 506 above a predefined temperature (e.g., 100 degrees Celsius), which causes the inhibitor 206 inside the substrate 500 along the path 506 to decompose (as described above with reference to FIG. 2 and FIG. 5A). Once the inhibitor is decomposed, the first base component and the second base component along the path 506 in the substrate 500 are free to cohesively bond with each other (i.e., step 116 of the reaction schema 100 occurs within the boundaries of the path 506).

Continuing, the method 700 includes assembling (730) the first and second silicone substrates to create a contact interface between the first and second silicone substrates. For example, with reference to FIGS. 4A-4B, the first substrate 400 is positioned on the surface 403 of the second substrate 402, such that the contact interface 404 is formed between the first substrate 400 and the second substrate 402. At this stage (730), the first and second substrates still have not been exposed to an elevated temperature, and, consequently, the first and second silicone substrates are still partially cured (i.e., they are both still in partially-cured states) (732). In some embodiments, assembling the first and second polymer substrates includes moving the first silicone substrate onto the second silicone substrate using a pick-and-place machine (or vice versa).

In some embodiments, a water-soluble polymer is placed between a first and second silicone substrate, and then the subsequent composition is exposed to elevated temperature (s), and then dipped in an aqueous solution. The resulting composition comprises a first and second silicone substrate with a vacant channel between the first and second silicone substrate.

In those embodiments (step 724) where the path is defined in the surface of the first silicone substrate (and/or the second silicone substrate), assembling the first and second silicone substrates includes positioning (734) the path defined in the surface of the first silicone substrate within, at least partially, the contact interface formed between the first and second silicones substrates. In some embodiments, one end of the path is positioned along an edge of the first and second substrates. In this way, that end of the path is able to receive a fluid from a pressure source. Positioning the first and second substrates together is discussed in more detail above with reference to FIGS. 5B and 5C.

The method also includes heating (736) the first and second silicone substrates at or above a predefined temperature, which causes (i) the inhibitor to at least partially decompose, and (ii) a crosslinking reaction, across the contact interface, between unbonded crosslinkable groups (previously linked with the inhibitor) of the first silicone substrate and unbonded crosslinkable groups of the second silicone substrate. In some embodiments, the predefined temperature is approximately 100 degrees Celsius (738). It is noted that the predefined temperature is dependent on the type of inhibitor used, as each distinct inhibitor will have a unique decomposition temperature. Note also that the heating (736) causes a crosslinking reaction within the first and second silicone substrates, such that additional polymerization/crosslinking within each of the silicone substrates also takes place (e.g., in addition to the crosslinking occurring across the contact interface). In the end, the first silicone substrate is fully cured after the heating (740). The second silicone substrate may also be fully cured after the heating. Once fully cured, a unitary 3D part is formed.

To further illustrate and using the example above where the first base component is formed from a first siloxane polymer that includes a plurality of hydride-functional groups and the second base component is a second siloxane polymer that includes a plurality of vinyl-functional groups. In that example, the inhibitor blended with the first and second base components becomes linked with one or more crosslinkable groups, less than all, from the plurality of vinyl-functional groups of the second siloxane polymer during the blending operation (702), or shortly thereafter. Furthermore, as also mentioned above, the second silicone substrate may be formed from (i) a third siloxane polymer comprising a plurality of hydride-functional groups and (ii) a fourth siloxane polymer comprising a plurality of vinyl-functional groups. Just before the heating (736), the second silicone substrate is in a partially-cured state, meaning that the second silicone substrate is in state shown at step 114 or step 226. In such a state, the second silicone substrate includes one or more groups from the plurality of hydride-functional groups of the third siloxane substrate that remain unbonded.

Accordingly, said heating (736) causes the inhibitor linked with, or otherwise blocking the one or more crosslinkable groups from the plurality of vinyl-functional groups of the second siloxane polymer to decompose or be removed. Once the inhibitor decomposes, the one or more crosslinkable groups from the plurality of vinyl-functional groups of the second siloxane polymer decomposes (previously linked with the inhibitor) are free to bond with unbonded hydride-functional groups (e.g., unbonded groups in the first silicone substrate and the second silicone substrate). Thus, the heating (736) subsequently causes at least a crosslinking reaction between at least some of the one or more crosslinkable groups from the plurality of vinyl-functional groups of the second siloxane polymer and the unbonded crosslinkable groups from the plurality of hydride-functional groups of the third siloxane substrate. In doing so, a contact interface is formed between the first and second silicone substrates that includes chemical crosslinks between the second siloxane polymer and the third siloxane polymer.

In those embodiments (step 724) where the path is defined in the surface of the first silicone substrate (and/or the second silicone substrate), heating the first and second silicone substrates forms an unbonded channel (e.g., channel 509, FIG. 5C) between the first and second silicone substrates at the path's location within the contact interface (742). Forming the channel 509 is discussed in further detail above with reference to FIGS. 5A-5C.

In some embodiments, the method 700 also includes compressing (744) the first and second silicone substrates together, which may take place during or after the heating (736). In some instances, the heating and compressing may involve placing the first and second silicone substrates into a heated compression mold (or some other heat-compressible mold assembly). In some instances, the heating and compressing may involve placing the first and second silicone substrates in an autoclave or some other vacuum chamber.

Figure 8:
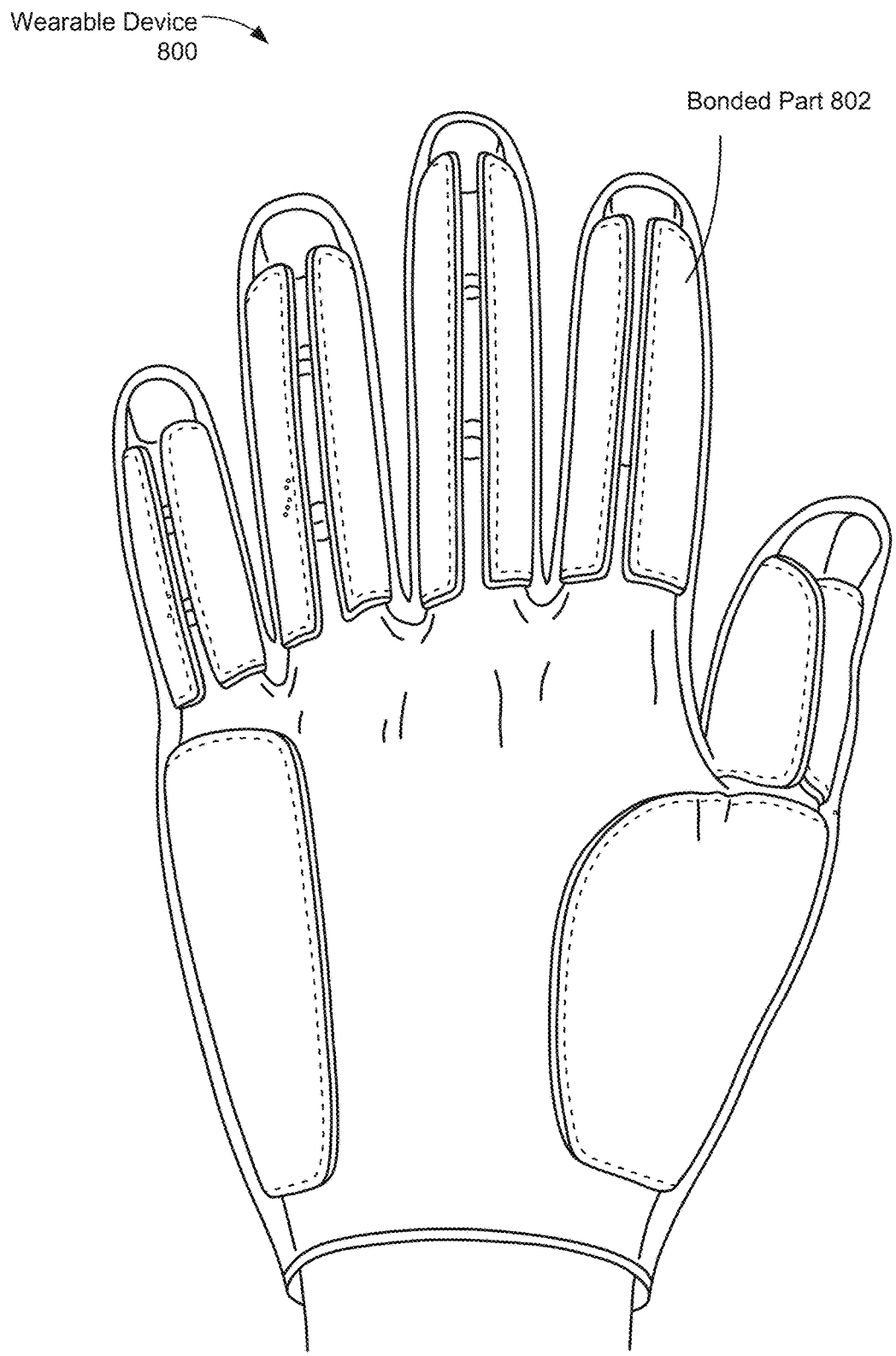
FIG. 8 shows a wearable device having multiple polymer articles created using the reaction schema in FIG. 2 in accordance with some embodiments.

FIG. 8 shows a wearable device 800 having multiple polymer articles 802 for creating haptic feedback in accordance with some embodiments. Specifically, the wearable device 800 is used to provide haptic stimulations to a wearer of the wearable device 800. The wearable device 800 may be part of a virtual-reality, augmented-reality, or mixed-reality system, and the wearable device 800 is configured to create haptic stimulations that correspond to virtual/augmented events displayed to the user of the system.

The polymer articles 802 included in the wearable device 800 provide haptic feedback to the wearer of the wearable device 800, and the articles 802 may be fabricated using any of the techniques discussed herein (e.g., the process shown in FIGS. 5A-5C). Each of the polymer articles 802 may be pneumatically/hydraulically coupled to a pressure changing device (e.g., an air or fluid pump), via tubing (not shown). Accordingly, based on signals from a computing device (e.g., a console running the virtual reality system), one or more of the polymer articles 802 can be pressurized (or depressurized) (e.g., a fluid can be injected in the channel 509, FIG. 5C). Once pressurized, the polymer articles 802 are configured to change shape and, in doing so, provide a haptic stimulation to the wearer. For example, a polymer article 802 positioned on a palmar surface of a wearer's index finger may curl when pressurized, and as a result, the wearer's index finger may also curl (or experience a curling sensation), thereby providing a haptic stimulation to the wearer. In some instances, each polymer article 1102 has an air-tight internal cavity, or one or more airtight channels 509 shown in FIG. 5C.

In some instances, one or more of the polymer articles 802 includes at least one channel (e.g., created using the techniques disclosed with reference to FIGS. 5A-5C). Furthermore, each of the polymer articles 802 may be fabricated using the techniques described with reference to the method 700. For ease of discussion going forward, a representative polymer article 802 is composed of two substrates made using the reaction schema 200 of FIG. 2, as shown in FIGS. 9A and 9B.

Figure 9A:
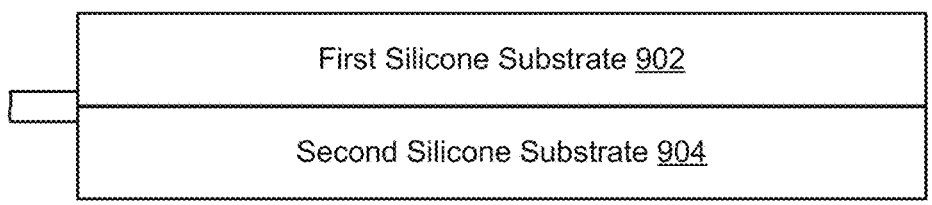
FIGS. 9A-9B show a bonded part changing shape in response to being pressurized in accordance with some embodiments.
Figure 9B:
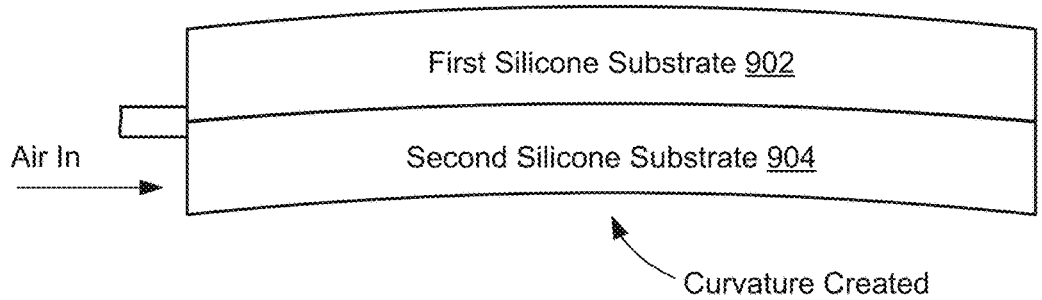

FIGS. 9A-9B show a representative silicone article 802 transitioning from an unpressurized state (FIG. 9A) to a pressurized state (FIG. 9B) in accordance with some embodiments. Specifically, the representative polymer article 802 includes a first silicone substrate 902 bonded (e.g., chemically cross-linked) with a second silicone substrate 904. The silicone substrates 902, 904 that compose the representative silicone article 802 are fully cured. For ease of illustration, the representative silicone article 802 is shown as a flat, planar part; however, various other shapes are possible (e.g., a channel that wrap around a user's finger could also be made, along with various other shapes). Although not shown, the representative polymer article 802 may include a cavity or channel(s) between the first substrate 902 and the second substrate 904 (e.g., channel 509, FIG. 5C), which is configured to receive a medium (e.g., fluid, air, gas, etc.). The first and second substrates 902, 904 may be elastic or inelastic. Alternatively, the first substrate 902 may be elastic while the second substrate 904 may be less elastic (or vice versa).

Material properties (e.g., elastic versus inelastic) of the first and second substrates 902, 904 can contribute to the shape taken by the representative silicone article 802. For example, if the first substrate 902 is highly elastic relative to the elasticity of the second substrate 904, then the representative silicone article 802 may be configured to curve (i.e., curl) in a first direction when the representative polymer article 802 is pressurized, i.e., is in a pressurized state. This result occurs because the first substrate 902 bulges away from the second substrate 904, at least partially, when in the pressurized state, due to its elasticity. In some instances, the second substrate 904 is pulled upwards by the first substrate 902 when the first substrate 902 bulges, which results in the wearer experiencing a first haptic stimulation. Conversely, when the first substrate 902 is highly inelastic relative to an elasticity of the second substrate 904, then the second substrate 904 may be configured to curve in a second direction opposite the first direction when the representative polymer article 802 is pressurized, due to its elasticity. This result occurs because the second substrate 904 bulges away from the first substrate 902, at least partially, when in a pressurized state. In such cases, the wearer experiencing a second haptic stimulation different from the first haptic stimulation. Note the first and second silicone substrates 902, 904 may be made from different silicones. In this way, different degrees elasticity can be achieved in the representative silicone article 802.

Figure 10A:
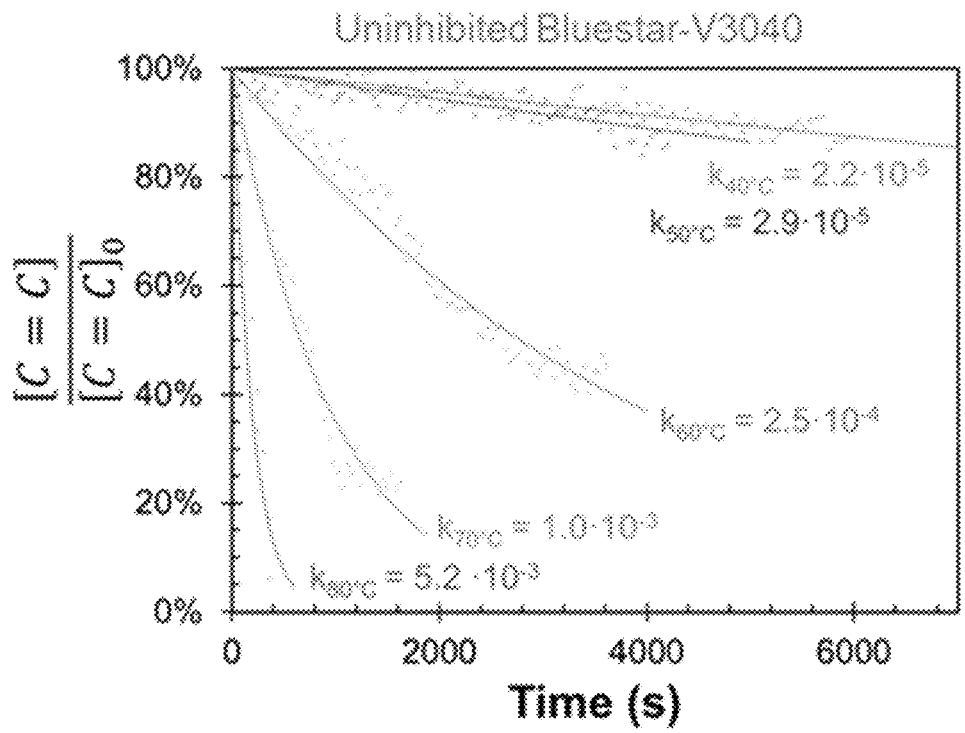
FIGS. 10A-10C illustrate the results of FTIR experiments that track the vinyl (C=C) bond density over time at different temperatures; each line represents a different temperature during experiment.
Figure 10B:
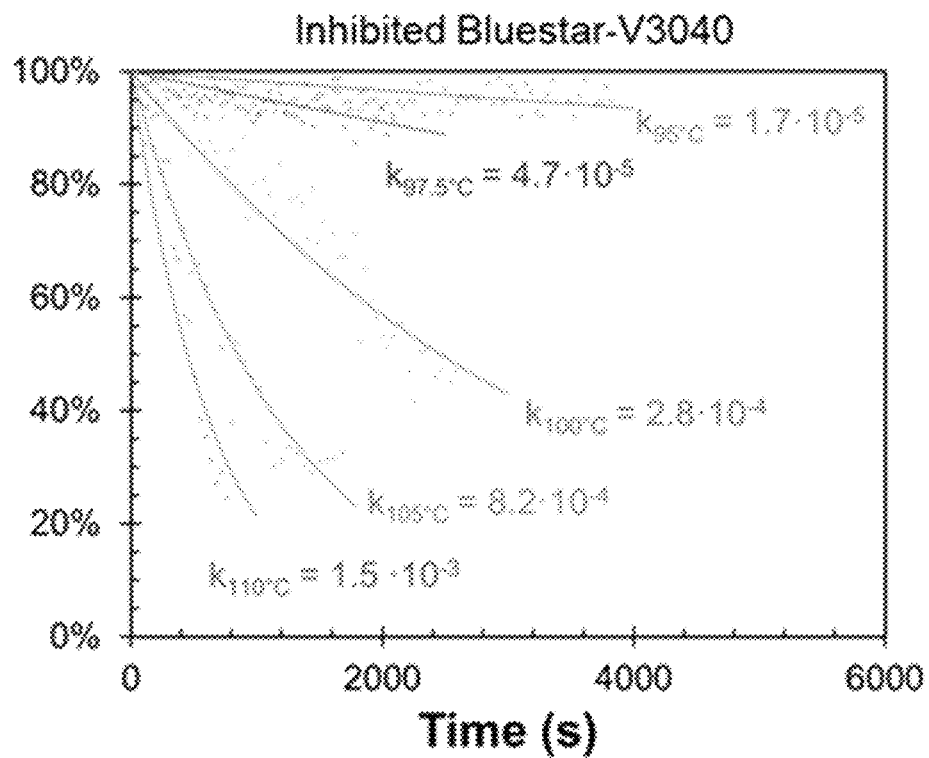
Figure 10C:
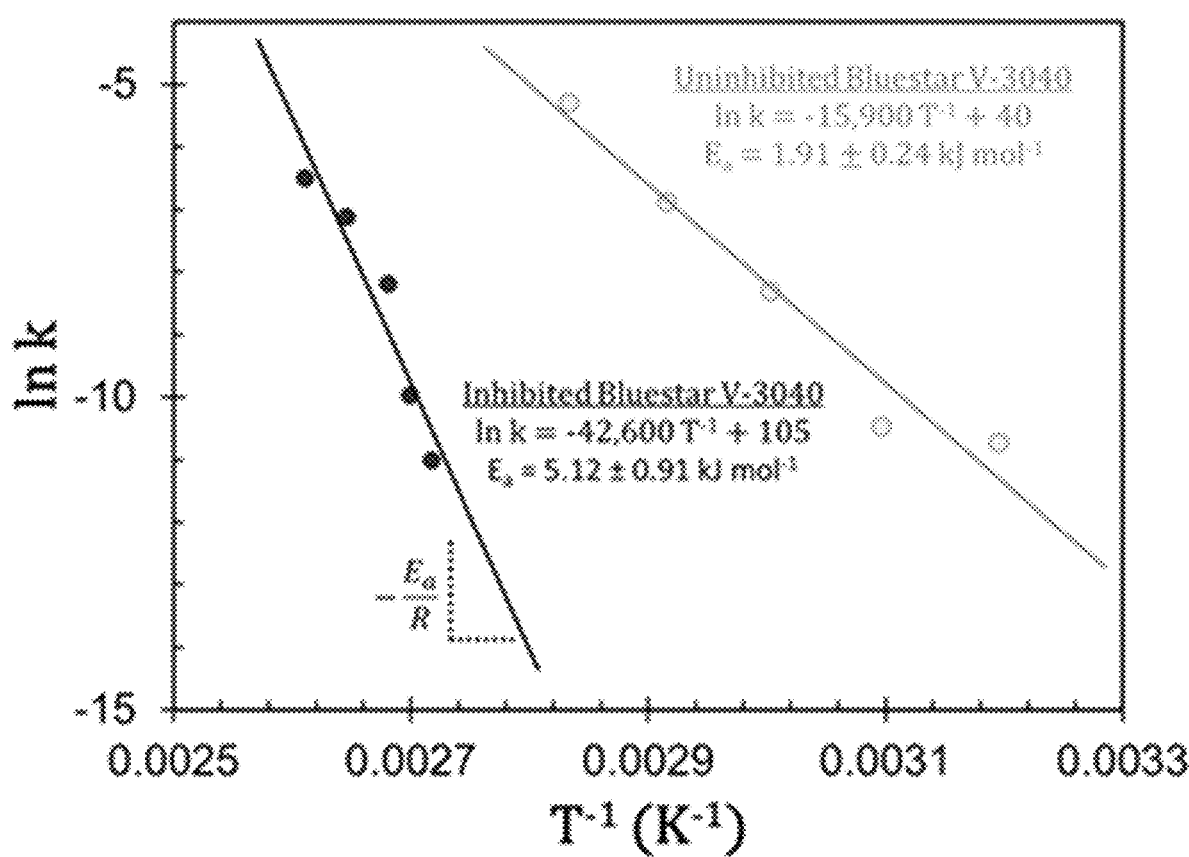

As shown in FIGS. 10A-10C are the results of FTIR experiments that track the vinyl (C=C) bond density over time at different temperatures; each line represents a different temperature during experiment. FIG. 10A illustrates the normally processed material (Bluestar V3040), while FIG. 10B illustrates the inhibited material. The data was then fitted to an exponential decay to extract rate constants k. Each temperature has its own corresponding rate constant, which are thereafter fitted to the Arrhenius equation (Eq 2) and extracted the activation energy (FIG. 10C):

$$\frac{[C=C]}{[C=C]_0} = e^{-kt} \qquad [\text{Eq. 1}]$$

$$k = Ae^{-E_a/RT} \qquad [\text{Eq. 2}]$$

-continued $$\ln k = -\frac{E_a}{R}\left(\frac{1}{T}\right) + \ln A \quad [\text{Eq. 2.1}]$$

$$E_{a_{Inhibited}} \approx 5.12 \pm 0.91 \frac{kJ}{\text{mol}}$$

$$E_{a_{Uninhibited}} \approx 1.91 \pm 0.24 \frac{kJ}{\text{mol}}$$

$$\left[\frac{k_{Inhibited}}{k_{Uninhibited}}\right]_{T=20^\circ C.} \approx \frac{Ai}{Au}[\exp - (Ea, i - Ea, u)/RT]$$

Shown in FIGS. 11A-11D are the results of FTIR experiments that track the vinyl (C=C) bond density over time at different temperatures for Nusil R21-2615; each line represents a different temperature during experiment. FIG. 11A shows the normally processed material (Nusil R21-2615), while FIG. 11B shows the plot for the inhibited material. The data was fitted to an exponential decay to extract rate constants k as described herein. Each temperature has its own corresponding rate constant. The constants were fitted to the Arrhenius equation (Eq 2) and the activation energy extracted (FIG. 11C). FIG. 11D illustrates the theoretical rate of C=C reaction in the inhibited and uninhibited systems. At 20° C. the inhibited silicone has approximately $10^{-4}$ times slower reaction of C=C groups. The max and min lines reflect the uncertainty that propagates from the fitting method, which appears relatively large, but shows that the reaction is about 1000 times slower at 20° C.

Shown in FIG. 12 is a comparison in the bond strength for Bluestar-V3040 bonded to itself by different methods. The top line corresponds to a process including inhibiting the material, demolding, assembling and heating (as outlined in FIGS. 4A and 4B). The bottom line corresponds to a process including using plasma treatment methods established in literature (200 W, $O_2$ plasma, 1 min). The coupons are then autoclaved (sterilized) with supersaturated steam (T<134° C.) for varying periods of time. The inhibited bonded samples possess a greater initial bond strength and maintain cohesive failure for over 8 hours of sterilization. The bond strength of plasma bonded samples rapidly degrades in these conditions.

Shown in FIGS. 13A-13H are the steps of an exemplary process and resulting article described herein. FIGS. 13A, 13B, 13C, and 13D illustrate the steps of weighing various components of a resin mixture, and then mixing, degassing, and casting the mixture to form a film as described herein. In this particular non-limiting example, the Bluestar V3040 silicone system was used with added 0.08% by mass Luperox DDM-9 inhibitor (commercial 2-butanone peroxide solution). FIG. 13E illustrate a resulting flexible film including a gelled (or partially cured) resin mixture. FIGS. 13F and 13G illustrate the use of a flexible film including a gelled (or partially cured) resin mixture as used in a thermoforming application, the thermoforming including at least one shape forming step and at least one heating step. FIG. 13H illustrate a fully cured article as demolded from the target shape after a thermoforming process.

Although some of various drawings illustrate a number of logical stages in a particular order, stages which are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software, or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

The following clauses describe certain embodiments.

Clause 1: a gelled or partially cured resin mixture comprising a first polymer component comprising a plurality of —$CH_2$—$CH_2$—Si— groups, a second polymer component comprising a plurality of —CH=$CH_2$ groups, and a third polymer component comprising a plurality of Si—H groups, wherein the stoichiometric ratio of —$CH_2$—$CH_2$—Si—:—CH=$CH_2$:Si—H=x:y:z, wherein x ranges from about 0.1 to about 0.9, x+y=1, and x+z ranges from 1 to about 1.5.

Clause 2: the gelled or partially cured resin mixture clause 1, wherein x ranges from about 0.1 to about 0.25, from about 0.1 to about 0.5, or from about 0.1 to about 0.75.

Clause 3: the gelled or partially cured resin mixture of clause 1, wherein x is selected from about 0.1, about 0.2, about 0.3, about 0.4, about 0.5, about 0.6, about 0.7, about 0.8, and about 0.9.

Clause 4: the gelled or partially cured resin mixture of any one of clauses 1 to 3, wherein x+z ranges from 1 to about 1.1, from 1 to about 1.15, from 1 to about 1.15, from 1 to about 1.2, or from 1 to about 1.25.

Clause 5: the gelled or partially cured resin mixture of any one of clauses 1 to 4, further comprising a metal catalyst.

Clause 6; the gelled or partially cured resin mixture clause 5, wherein the metal is platinum.

Clause 7: the gelled or partially cured resin mixture of any one of clauses 1 to 6, further comprising an inhibitor.

Clause 8: the gelled or partially cured resin mixture of clause 7, wherein the concentration of the inhibitor in the gelled or partially cured resin mixture is between 0.0001% and 0.1% by weight.

Clause 9: the gelled or partially cured resin mixture of clause 7 or 8, wherein the inhibitor is a hydroperoxide compound.

Clause 10: the gelled or partially cured resin mixture of any one of clauses 1 to 9, wherein the gelled or partially cured resin mixture is shelf stable at a given temperature for a period of time between 1 day and about 365 days.

Clause 11: the gelled or partially cured resin mixture of any one of clauses 1 to 9, wherein the gelled or partially cured resin mixture is shelf stable at a given temperature for a period of time between 1 week and about 100 weeks.

Clause 12: the gelled or partially cured resin mixture of clause 10 or 11, wherein the temperature is room temperature.

Clause 13: the gelled or partially cured resin mixture of clause 10 or 11, wherein the temperature is about 15° C., about 20° C., or about 25° C.

Clause 14: the gelled or partially cured resin mixture of any one of clauses 1 to 9, wherein the gelled or partially cured resin mixture is shelf stable at room temperature for at least one day, at least one week, or at least one month.

Clause 15: the gelled or partially cured resin mixture of any one of clauses 1 to 9, wherein the gelled or partially cured resin mixture has unlimited shelf stability when refrigerated at a temperature lower than room temperature.

Clause 16: the gelled or partially cured resin mixture of clause 15, wherein the temperature is about 15° C., about 10° C., about 5° C., or about 0° C.

Clause 17: the gelled or partially cured resin mixture of any one of clauses 1 to 16, wherein the gelled or partially cured resin mixture can topographically conform to a 3D surface.

Clause 18: the gelled or partially cured resin mixture of any one of clauses 1 to 16, wherein the gelled or partially cured resin mixture is stretchable.

Clause 19: a process of making a polymer article, the process comprising providing, obtaining, or receiving the gelled or partially cured resin mixture of any one of clauses 1 to 18, and subjecting the gelled or partially cured resin mixture to a temperature higher than room temperature.

Clause 20: the process of clause 19, wherein the temperature is lower than 100° C.

Clause 21: the process of clause 19, wherein the temperature is about 99° C., about 95° C., about 90° C., about 85° C., about 80° C., about 75° C., about 70° C., about 65° C., about 60° C., about 55° C., or about 50° C.

Clause 22: the process of any one of clauses 19 to 21, further comprising a mechanical processing step.

Clause 23: the process of clause 22, wherein the mechanical processing step comprises thermoforming.

Clause 24: the process of clause 22, wherein the mechanical processing step comprises stretching.

Clause 25: the process of clause 22, wherein the mechanical processing step comprises compressing.

Clause 26: the process of clause 22, wherein the mechanical processing step comprises molding.

Clause 27: the process of clause 22, wherein the mechanical processing step comprises conforming the gelled or partially cured resin mixture to a 3D topography.

Clause 28: the process of clause 22, wherein the mechanical processing step comprises applying to the gelled or partially cured resin a negative or positive pressure.

Clause 28: the process of clause 22, wherein the mechanical processing step comprises attaching a first portion of gelled or partially cured resin mixture to a second portion of gelled or partially cured resin mixture.

Clause 29: the process of clause 28, wherein the stoichiometric ratios of —$CH_2$—$CH_2$—Si—:—CH=$CH_2$:Si—H in the first and second portions are substantially different.

Clause 30: the process of clause 28, wherein the stoichiometric ratios of —$CH_2$—$CH_2$—Si—:—CH=$CH_2$:Si—H in the first and second portions are substantially similar.

Clause 31: the process of clause 28, wherein the stoichiometric ratios of —$CH_2$—$CH_2$—Si—:—CH=$CH_2$:Si—H in the first and second portions are identical.

Clause 32: a polymer article comprising: a first silicone component formed from (i) a first siloxane polymer comprising a first plurality of hydride-functional groups and (ii) a second siloxane polymer comprising a first plurality of vinyl-functional groups; a second silicone component formed from (i) a third siloxane polymer comprising a second plurality of hydride-functional groups and (ii) a fourth siloxane polymer comprising a second plurality of vinyl-functional groups; and a contact interface, between the first and second silicone components, comprising chemical crosslinks between the first siloxane polymer and the fourth siloxane polymer, wherein a tensile strength of the polymer article across the contact interface is substantially equal to a tensile strength of the first silicone component or the second silicone component alone.

Clause 33: the polymer article of clause 32, wherein the second silicone component further comprises hydroperoxide-reaction products.

Clause 34: the polymer article of clause 33, wherein: a reaction between the third siloxane polymer and the fourth siloxane polymer further comprises a hydroperoxide inhibitor; and the hydroperoxide-reaction products are formed from the hydroperoxide inhibitor.

Clause 35: the polymer article of clause 34, wherein between 0.0001% and 0.1% by weight of the hydroperoxide inhibitor is included in the reaction between the third siloxane polymer and the fourth siloxane polymer.

Clause 36: the polymer article of clause 34, wherein the hydroperoxide inhibitor is configured to: react with one or more crosslinkable groups from the second plurality of vinyl-functional groups of the fourth siloxane polymer to limit a first crosslinking reaction between the third and fourth siloxane polymers; and decompose when heated above a threshold temperature, wherein decomposition of the hydroperoxide inhibitor triggers a second crosslinking reaction between at least some of the one or more crosslinkable groups from the second plurality of vinyl-functional groups and unbonded crosslinkable groups from the first plurality of hydride-functional groups of the first siloxane polymer.

Clause 37: the polymer article of clause 36, wherein: the first crosslinking reaction is triggered by a first amount of energy; the second crosslinking reaction is triggered by a second amount of energy that is greater than the first amount of energy; and the hydroperoxide inhibitor is designed to set the second amount of energy.

Clause 38: the polymer article of clause 32, wherein mechanical and/or thermal properties of the contact interface are substantially similar to the mechanical and/or thermal properties of the first silicone component and the second silicone component.

Clause 39: a method of forming a three-dimensional polymer article, comprising: providing a first silicone substrate that is partially cured and formed from (i) a first siloxane polymer comprising a first plurality of hydride-functional groups, (ii) a second siloxane polymer comprising a plurality of vinyl-functional groups, and (iii) a chemical inhibitor linked with one or more crosslinkable groups, less than all, from the plurality of vinyl-functional groups; assembling the first silicone substrate with a second silicone substrate, which is also partially cured, to create a contact interface between the first and second silicone substrates, wherein the second silicone substrate includes a third siloxane polymer with a second plurality of hydride-functional groups having unbonded crosslinkable groups; after the assembling, heating the first and second silicone substrates above a predefined temperature, which causes (i) the chemical additive to at least partially decompose, and (ii) a second crosslinking reaction, across the contact interface, between at least some of the one or more crosslinkable groups from the plurality of vinyl-functional groups and the unbonded crosslinkable groups from the second plurality of hydride-functional groups of the third siloxane polymer, wherein a tensile strength of the three-dimensional polymer article across the contact interface is substantially equal to a tensile strength of the first silicone substrate or the second silicone substrate alone.

Clause 40: the method of clause 39, wherein providing the first silicone substrate comprises: blending the first siloxane polymer, the second siloxane polymer, and the chemical inhibitor to form a blended resin; and producing the first silicone substrate from the blended resin.

Clause 41: the method of clause 40, wherein producing the first silicone substrate from the blended resin comprises: adding a portion of the blended resin to a mold that has a first shape; and after the portion of the blended resin in the mold holds the first shape of the first mold, removing the portion of the blended resin, now partially cured and forming the first silicone substrate, from the mold.

Clause 42: the method of clause 40, wherein: the blending initiates the first crosslinking reaction between the first siloxane polymer, the second siloxane polymer, and the chemical inhibitor; and the chemical inhibitor occupies a number of crosslink-bond sites of the second siloxane polymer during the first crosslinking reaction, which limits crosslinking between the first and second siloxane polymers during the first crosslinking reaction.

Clause 43: the method of clause 42, wherein: the first crosslinking reaction is initiated at a first activation energy; the second crosslinking reaction is initiated at a second activation energy that is greater than the first activation energy; and a magnitude of the second activation energy is dictated by the chemical inhibitor.

Clause 44: the method of clause 39, wherein assembling the first and second silicone substrates comprises moving the first silicone substrate onto the second silicone substrate using a pick-and-place machine.

Clause 45: a polymer composition comprising: a blended resin comprising: a first siloxane polymer comprising a plurality of hydride-functional groups; a second siloxane polymer comprising a plurality of vinyl-functional groups; and an hydroperoxide inhibitor that is configured to temporarily inhibit some, but not all, of the plurality of vinyl-functional groups from forming chemical crosslinks with the plurality of hydride-functional groups, wherein the hydroperoxide inhibitor is between 0.0001% and 0.1% by weight of the blended resin.

Clause 46: the polymer composition of clause 45, wherein the hydroperoxide inhibitor is further configured to react with one or more crosslinkable groups from the plurality of vinyl functional groups of the second siloxane polymer to limit a crosslinking reaction between the first and second siloxane polymers.

Clause 47: the polymer composition of clause 45, wherein: when the blended resin is exposed to a first temperature: some of the plurality of hydride-functional groups form chemical crosslinks with some, but not all, of the plurality of vinyl-functional groups, the hydroperoxide inhibitor reacts with some, but not all, of the plurality of vinyl-functional groups.

Clause 48: the polymer composition of clause 47, wherein: when the blended resin is exposed to a second temperature greater than the first temperature: the hydroperoxide inhibitor decomposes; and the plurality of hydride-functional groups forms chemical crosslinks with any unbonded vinyl-functional groups of the plurality of vinyl-functional groups.

What is claimed is:

1. A process of making a polymer article, the process comprising:
providing, obtaining, or receiving a flexible film comprising a gelled or partially cured resin mixture comprising a first polymer component comprising a plurality of —$CH_2$—$CH_2$—Si— groups, a second polymer component comprising a plurality of —CH=$CH_2$ groups, and a third polymer component comprising a plurality of Si-H groups, wherein the stoichiometric ratio of —$CH_2$—$CH_2$—Si—:—CH=$CH_2$:Si—H=$x_1 : y_1 : z_1$, wherein $x_1$ ranges from about 0.1 to about 0.9, $x_1 + y_1 = 1$, and $x_1 + z_1$ ranges from 1 to about 1.5,
shaping the flexible film by vacuum bagging, vacuum forming, thermoforming, and/or compression molding, and
subjecting the shaped film comprising the gelled or partially cured resin mixture to a temperature higher than room temperature.

2. The process of claim 1, wherein the temperature is lower than 100° C.

3. The process of claim 1, wherein $x_1$ ranges from about 0.1 to about 0.25, from about 0.1 to about 0.5, or from about 0.1 to about 0.75.

4. The process of claim 1, wherein $x_1$ is selected from about 0.1, about 0.2, about 0.3, about 0.4, about 0.5, about 0.6, about 0.7, about 0.8, and about 0.9.

5. The process of claim 1, wherein $x_1 + z_1$ ranges from 1 to about 1.1, from 1 to about 1.15, from 1 to about 1.15, from 1 to about 1.2, or from 1 to about 1.25.

6. The process of claim 1, wherein the gelled or partially cured resin mixture, further comprises a metal catalyst.

7. The process of claim 6, wherein the metal catalyst is platinum.

8. The process of claim 1, wherein the gelled or partially cured resin mixture, further comprises an inhibitor.

9. The process of claim 8, wherein the concentration of the inhibitor is between 0.0001% and 0.1% by weight.

10. The process of claim 8, wherein the inhibitor is a hydroperoxide compound.

11. The process of claim 1, wherein the shaping of the flexible film is by thermoforming.

12. The process of claim 1, wherein the flexible film comprising the gelled or partially cured resin mixture is topographically conformed to a 3D surface, and/or wherein the flexible film comprising the gelled or partially cured resin mixture is stretched.

13. The process of claim 1, wherein the shaping of the flexible film is by vacuum bagging.

14. The process of claim 1, wherein the shaping of the flexible film is by vacuum forming.

15. The process of claim 1, wherein the shaping of the flexible film is by compression molding.

* * * * *